United States Patent
Marquardt et al.

(10) Patent No.: US 9,817,854 B2
(45) Date of Patent: *Nov. 14, 2017

(54) GENERATING AND STORING SUMMARIZATION TABLES FOR SEARCHABLE EVENTS

(71) Applicant: Splunk Inc., San Francisco, CA (US)

(72) Inventors: David Ryan Marquardt, San Francisco, CA (US); Stephen Phillip Sorkin, San Francisco, CA (US); Steve Yu Zhang, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/007,185

(22) Filed: Jan. 26, 2016

(65) Prior Publication Data

US 2016/0154832 A1    Jun. 2, 2016

Related U.S. Application Data

(63) Continuation of application No. 14/815,973, filed on Aug. 1, 2015, which is a continuation of application
(Continued)

(51) Int. Cl.
*G06F 7/00* (2006.01)
*G06F 17/30* (2006.01)

(52) U.S. Cl.
CPC ........ *G06F 17/30321* (2013.01); *G06F 17/30* (2013.01); *G06F 17/30457* (2013.01);
(Continued)

(58) Field of Classification Search
CPC ................................. G06F 17/30457
See application file for complete search history.

(56) References Cited

U.S. PATENT DOCUMENTS 6,836,894 B1 * 12/2004 Hellerstein ........... G06F 11/323
                                                          345/619
7,581,019 B1 * 8/2009 Amir ...................... H04L 47/10
                                                          370/235

(Continued)

OTHER PUBLICATIONS

Saint-Paul, Regis et al.; General purpose database summarization; 2005; VLDB Endowment; p. 733-744.*
(Continued)

*Primary Examiner* — Tuan A Pham

(57) ABSTRACT

Embodiments are directed are towards the transparent summarization of events. Queries directed towards summarizing and reporting on event records may be received at a search head. Search heads may be associated with one more indexers containing event records. The search head may forward the query to the indexers the can resolve the query for concurrent execution. If a query is a collection query, indexers may generate summarization information based on event records located on the indexers. Event record fields included in the summarization information may be determined based on terms included in the collection query. If a query is a stats query, each indexer may generate a partial result set from previously generated summarization information, returning the partial result sets to the search head. Collection queries may be saved and scheduled to run and periodically update the summarization information.

18 Claims, 16 Drawing Sheets

Related U.S. Application Data

No. 14/170,159, filed on Jan. 31, 2014, now Pat. No. 9,128,985, which is a continuation of application No. 13/756,147, filed on Jan. 31, 2013, now Pat. No. 8,682,925.

(52) U.S. Cl.
CPC .. *G06F 17/30477* (2013.01); *G06F 17/30554* (2013.01); *G06F 17/30595* (2013.01); *G06F 17/30864* (2013.01)

(56) References Cited

U.S. PATENT DOCUMENTS

| | | | |
|---|---|---|---|
| 9,128,985 B2 | 9/2015 | Marquardt et al. | |
| 2002/0065976 A1* | 5/2002 | Kahn | G06F 17/3089 711/1 |
| 2009/0063524 A1* | 3/2009 | Adler | G06F 17/30241 |
| 2011/0191373 A1 | 8/2011 | Botros et al. | |
| 2011/0302151 A1* | 12/2011 | Abadi | G06F 17/30445 707/714 |
| 2012/0008414 A1 | 1/2012 | Katz et al. | |
| 2012/0203794 A1* | 8/2012 | Zhang | G06F 17/30457 707/769 |
| 2012/0296889 A1* | 11/2012 | Davydok | G06F 17/30383 707/713 |
| 2014/0214888 A1 | 7/2014 | Marquardt | |
| 2016/0004750 A1 | 1/2016 | Marquardt et al. | |

OTHER PUBLICATIONS

U.S. Appl. No. 14/170,159, Notice of Allowance dated May 8, 2015.
"General Purpose Database Summarization"; Aug. 30, 2005; VLDB Endowment.
U.S. Appl. No. 14/815,973, Non-Final Office Action dated Jun. 2, 2016.
U.S. Appl. No. 14/815,973, Final Office Action dated Dec. 13, 2016.

\* cited by examiner

| Field::Value | Posting |
|---|---|
| City::ATL | 1, 4, 7, 10, 13 |
| City::BOS | 2, 5, 8, 11 |
| City::SEA | 3, 6, 9, 12, 14 |
| Dept::House | 1, 5, 6, 7, 10 |
| Dept::Jewelry | 2, 8, 11, 14 |
| Dept::Shoes | 3, 4, 9, 12, 13 |
| Price::100 | 8, 14 |
| Price::15 | 1, 3, 6, 9, 12 |
| Price::30 | 2, 4, 5 |
| Price::40 | 7, 10, 11, 13 |

GENERATING AND STORING SUMMARIZATION TABLES FOR SEARCHABLE EVENTS

CROSS-REFERENCE OF RELATED APPLICATIONS

This application claims benefit as a Continuation of application Ser. No. 14/815,973, filed Aug. 1, 2015, which claims benefit of U.S. patent application Ser. No. 14/170,159, filed Jan. 31, 2014, which claims benefit of U.S. patent application Ser. No. 13/756,147, filed Jan. 31, 2013, the entire contents of the aforementioned are hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

This invention relates generally to information organization, search, and retrieval and more particularly, but not exclusively, to generating summarization information of fields included in event records.

BACKGROUND

The rapid increase in the production and collection of machine generated data has created relatively large data sets that are difficult to search. The machine data can include sequences of time stamped records that may occur in one or more usually continuous streams. Further, machine data often represents some type of activity made up of discrete events.

Searching data requires different ways to express searches. Search engines today typically allow users to search by the most frequently occurring terms or keywords within the data and generally have little notion of event based searching. Given the large volume and typically repetitive characteristics of machine data, users often need to start by narrowing the set of potential search results using event-based search mechanisms and then, through examination of the results, choose one or more keywords to add to their search parameters. Timeframes and event-based metadata like frequency, distribution, and likelihood of occurrence are especially important when searching data, but difficult to achieve with current search engine approaches.

Also, users often generate arbitrary queries to produce statistics and metrics about selected data fields that may be included in the data. Indexing may enable event records to be identified quickly, but operations that examine/scan the individual event records may become prohibitively expensive as the number of event record grows ever larger. Thus, systems that can search relatively large sets of data are the subject of considerable innovation.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Description Of The Various Embodiments, which is to be read in association with the accompanying drawings, wherein:

FIG. 6 illustrates a portion of a summarization table in accordance with at least one of the various embodiments;

DETAILED DESCRIPTION OF THE DRAWINGS

Figure 1:
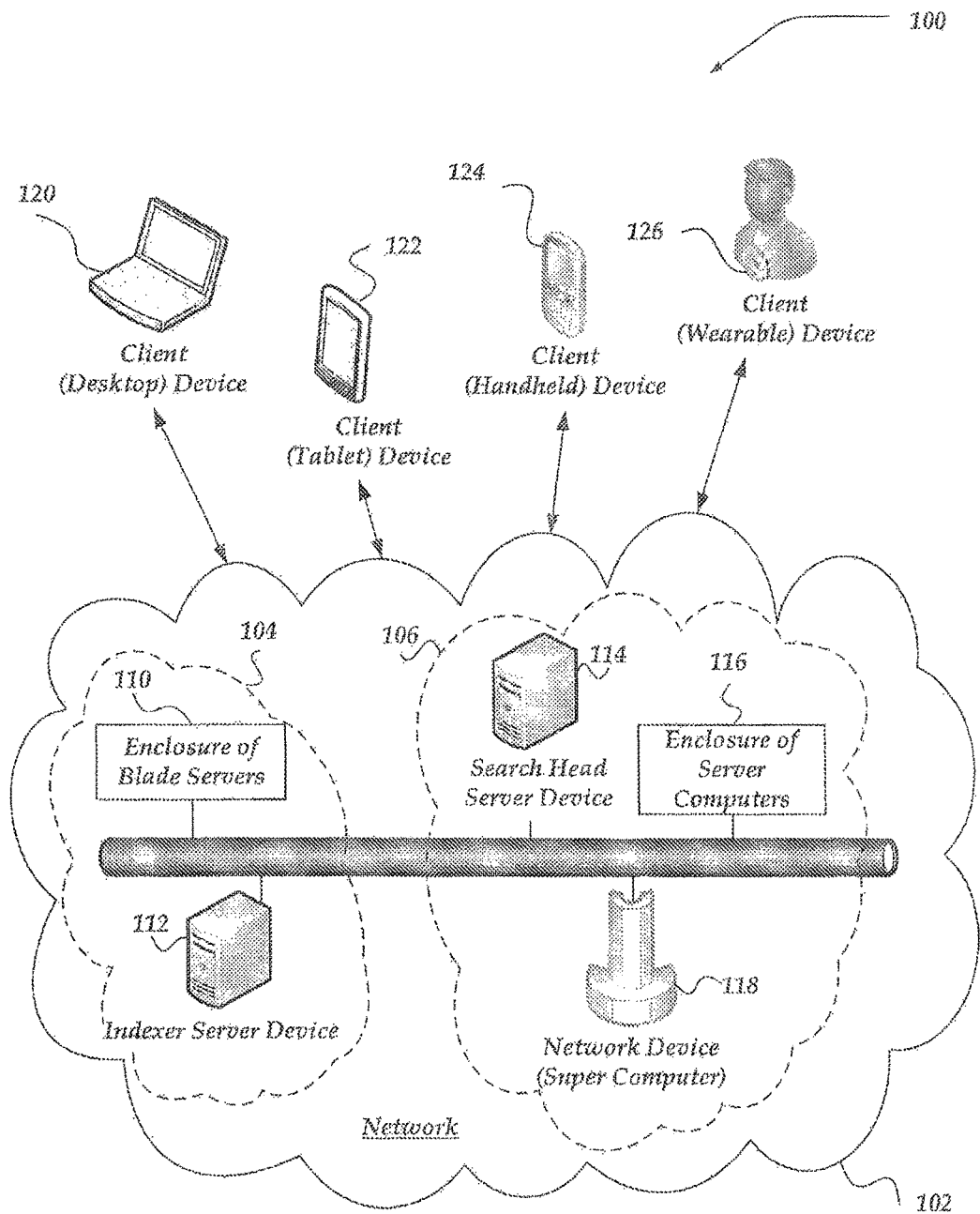
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "machine data" as used herein may include server logs and other types of machine data (i.e., data generated by machines). In at least one of the various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second.

The term "time series data" as used herein is data where each data record has a timestamp associated with it. A "Time Series Search Engine" is a search engine which, in at least one of the various embodiments, can perform queries limited by a time range (such as between one time and another, or data earlier than a given time, or the like) on the stored data and/or generate results ordered by time and/or timestamps (such as from earliest-to-latest or vice versa). In at least one of the various embodiments, the data records may be event records.

The term "data repository" as used herein refers to data sources that may contain unstructured or structured data, such as databases, file systems, search engine indexes, or the like. In at least one of the various embodiments, a data repository may be a live stream of data. In other cases, a data repository may be static data, or a combination of live data or static data. In at least one of the various embodiments, data repositories may provide interfaces such as, application programming interfaces (API) for receiving requests, queries regarding the data stored in the data repository.

The term "configuration information" as used herein refers to data and/or directives that may be employed by an application for performing action, such as indexing, transforming, and/or interpreting data received from data sources. Configuration information may be saved using various storage mechanisms, such as, file systems, databases, computer memory, or the like.

Configuration information may include rules that may be comprised of extraction rules, filters, matching functions, rules for determining "event boundaries" within data (e.g., rules for dividing an event stream into individual lines, rules for merging lines into multi-line events, or the like), rules for locating and parsing timestamps in data, or the like. The configuration information may be employed by an application to identify events of interest that may be included in machine-generated data, identify and extract fields within events, or the like.

The term "event record" may refer to computing data that is collected about an event for a computing system, including, for example, an action, characteristic, condition (or state) of the computing system. For example, such events may be about a computing system's performance, actions taken by the computing system, or the like. Event records may be obtained from various computing log files generated by the computer's operating system, and/or other monitoring application. However, event records are not restricted by a file format or structure from which the event data is obtained. In various embodiments, event records may include unstructured and/or structured machine data, or combination thereof.

The term "regular expression" as used herein refers to a sequence of constants and operators arranged into expressions for matching a set of strings. A regular expression is often defined as a pattern matching language which can be employed to identify character strings, for example, to select specific strings from a set of character strings. More particularly, regular expressions are often defined as a context-independent syntax that can represent a wide variety of character sets and character set orderings. In operation, regular expressions can be employed to search data based upon a predefined pattern or set of patterns. As such, this pattern matching language employs a specific syntax by which particular characters or strings are selected from a body of text. Although simple examples of regular expressions can be easily understood, oftentimes, the syntax of regular expressions are so complex that even the most experienced programmers have difficulty in understanding them. Regular expressions may be constructed using a variety of computer languages and constructs. In addition to matching, some regular expression systems offer functionality, such as, substitution, grouping, back references, or the like. Regular expressions and regular expression systems may be adapted to work with non-string data providing matching facilities for binary data.

The term "extraction rule" and/or "data field extraction rule" may refer to instructions that may be applied to identify and extract field values from event records. In some embodiments, an extraction rule may define a field within event records from which to extract a value. In at least one of various embodiments, extraction rules may include regular expressions. The data on which extraction rules may be applied may include data such as structured and/or unstructured machine data, or other type of data, including event records.

The term "summarization table" as used herein is a data structure that may be generated by an indexer server that includes at least field names and field values that have been extracted and/or indexed from event records. A summarization table may also include posting values that point to the location(s) in event partitions where the event records that include the field may be found. A summarization table may be sorted so that fields having the same name are grouped together. Also, a summarization table may be stored using well-know compression techniques to reduce its storage size.

The term "query" as used herein refers to commands and/or sequences of commands that are directed for searching, computing, and/or retrieving data from an event datastore, such as an indexer event partition. Queries generally produce results based on the form and structure of the particular query. Query results may be sorted and grouped based on the structure and form of the query. In at least one of the various embodiments, queries may include operators and functions for calculating values based on and/or derived from indexed event records, including functions that produce result sets that may include statistics and metrics about those event records. Structured Query Language (SQL) is a well-known query language often used to form queries for relational databases; herein queries may be described using a "SQL-like" form for readability. However, the various embodiments are not limited to using SQL-like formatting for queries. Thus, other well-known query languages and/or custom query languages may be employed consistent with what is claimed herein. In at least one of the various embodiments, queries may include search term expressions as well as data-analysis expressions.

The term "where clause expression" as used herein refers to a portion of a query that is used to limit the records returned and/or included in a result set. A where clause may be comprised of one or more where clause expressions that are connected by logical operands. In this document, where clauses are expressed using a SQL-like format. An example of a where clause with one expression is " . . . where City=SEA". An example of a where clause with multiple expressions is " . . . where City=SEA AND Dept=Shoes". Generally, the generic SQL meaning of where clauses apply to the embodiments described herein. Further, because a summarization table may include values other than field names with corresponding field values, a where clause may include search terms and/or expressions such as, "where kitten AND sleeping" enabling search-engine style searching of the dataset. Also, where clauses may include a combination of the different types of where clause expressions, such as "where kitten AND sleeping AND color=black."

The term "group-by clause expression" as used herein refers to portions of a query that are used to group a results into subsets that have matching values for one or more field. For example, " . . . group by City" will cause results to be presented in groups having the same value for City. Generally, the SQL meaning of group-by applies to the embodiments described herein.

The term "aggregation function" as used herein refers to queries that may contain functions that return aggregate values instead of individual records. At least one of the various embodiments support aggregation functions similar to SQL and other well-known query languages. Such examples of aggregation functions include, but are not limited to, AVG (average), SUM (sum), MAX (maximum value), RMS (root mean square), or the like. Aggregation functions are often paired with group-by clauses.

The term "posting value" as used herein is a value that references the location of a corresponding source event record in a datastore such as an event partition. In at least one of the various embodiments, posting values may include additional information about each referenced event record, such as timestamps, record size, meta-data, or the like. Each posting value may be assigned a unique identifier which may be used to access the event record and/or its associated metadata. In at least one of the various embodiments, the posting values may be ordered based on each event record's timestamp. For example, if numbers are used as identifiers, they may be sorted so event records having a later timestamp always have a lower valued identifier than event records with an earlier timestamp, or vice-versa. Posting values are often included in summarization tables for retrieving and/or identifying event records. For example, if a string entry such as "abcd" has posting values of 2, 5, and 10 event records that include the string "abcd" may be found in the second, fifth, and tenth positions within the appropriate event partition.

"Index", "Indexer", "Indexing", and "Index Storage" as used herein may represent elements of described embodiments that may index and store event records. Indexers may collect, parse, and store event records to facilitate fast and accurate information retrieval. Index design may incorporate interdisciplinary concepts from linguistics, cognitive psychology, mathematics, informatics, physics, and computer science. Also, Indexes may reside in flat files in a datastore on a file system which may be distributed and enables distributed computations. Index files may be managed to facilitate flexible searching and fast data retrieval, eventually archiving them according to a configurable schedule. During indexing, incoming event records may be processed to enable fast search and analysis, the results of which may be stored in an index. As part of the indexing process, the indexer may add knowledge to the data in various ways, including by: separating a data stream into individual, searchable events; creating or identifying timestamps; extracting fields such as host, source, and source type; performing user-defined actions on the incoming data, such as identifying custom fields, masking sensitive data, writing new or modified keys, applying breaking rules for multi-line events, filtering unwanted events, routing events to specified indexes or servers, and the like. Also, for a reducible structure of a reoccurring search, the indexer can perform a logical sequence of actions on the event records, e.g., computing averages, variances, root mean squares, or the like.

The term "collection query" as used herein refers to queries that include commands that generate summarization information and summarization tables from event records stored on indexers. A non-limiting example of a collection query may include "collect namespace='point-of-sale' fields='City Price Dept'" which may result in summarization information being generated for the fields, City, Price, and Dept from event records related to retail point of sale information.

The term "stats query" as used herein refers to queries that generate result sets that may produce aggregate and statistical results from event records. Also, if sufficient summarization information is available, stats queries may generate their result sets from the summarization information rather than directly scanning event records. A non-limiting example of a stats query may be "stats namespace='point-of-sale' count(*) . . . City=ATL" which may generate a result that shows the number of sales made in Atlanta. A SQL-type example of a stats query may be "select count(*) from . . . where City=ATL".

The term "data model" as used herein refers to a data model that at least defines semantic meaning for modeling unstructured data and/or structured data that may be stored in a data repository, such as, on indexers, event partitions, summary partitions or the like. Further, one or more data models may be generated such that the organization of the unstructured data may remain unmodified. Thus, data models, in at least one of the various embodiments, may provide semantic meaning to unstructured data without modifying the unstructured data.

A data model may be composed of one or more data model objects. In at least one of the various embodiments, data model objects may have a hierarchy analogous to an object-oriented programming class hierarchy. Further, in at least one of the various embodiments, data model objects may include fields, filters, constraints, or the like, that correspond to the data the data model object represents.

The term "search object" as used herein refers to a kind of data model object that may be an individual data model object selected by a user to generate queries. In this case, a search object may be a data model object selected from among the data model objects that comprise a data model. Also, search objects may be specialized objects that may include one or more data model objects, portions of one or more data model objects, or the like. In some embodiments, search objects may include fields, filters, constraints, that may be separate from those comprising data model objects.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards systems, apparatus, and methods for the transparent summarization of events. In at least one of the various embodiments, communications that include one or more queries and/or query information may be received at one or more search heads. These queries may be directed toward summarizing or searching event records. In at least one of the various embodiments, the search head that received the query may be associated with one more indexers that contain event records. Such indexers may be arranged in clusters, and each may be in communication with the search head over a network.

In at least one of the various embodiments, processes running at the search head may determine which indexers may be responsive to the query. Indexers responsive to the query may be determined based on a variety of factors, including the event records associated with the indexers and/or directives included in the query. If responsive indexers are available, the query may be forwarded to them for concurrent execution.

In at least one of the various embodiments, if one or more of the queries is a collection query, the responsive indexers may generate summarization information based on the fields of the event records located on the indexers. In at least one of the various embodiments, one or more of the event record fields used in the summarization information may be listed in the collection query and/or they may be determined based on terms included in the collection query. For example, a collection query may include an explicit list of fields to summarize. Or, in at least one of the various embodiments, a collection query may include terms or expressions that expand into to one or more fields, such as, " . . . fields'*' . . . ," which may expand to all fields.

In at least one of the various embodiments, if one or more of the queries is a stats query, each indexer may generate a partial result set from previously generated summarization information. The partial result sets may be returned to the search head that received the query and combined into a single result set for the query. In at least one of the various embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In at least one of the various embodiments, collection queries may be saved and scheduled to run periodically. These scheduled collection queries may periodically update the summarization information corresponding to the query.

In at least one of the various embodiments, collection queries may also be generated based on one or more data models and/or search objects. Search objects based on a data model may be employed to generate collection queries used for generating summarization information. Also, search objects associated with a data model may be employed to generate stats queries produced from the summarization information.

In at least one of the various embodiments, summarization tables that include fields, values, and posting value for event records may be included in the summarization information. Summarization tables may enable various stats queries to be performed absent scanning or search the event records.

In at least one of the various embodiments, summarization information may be stored in summary partitions. The summary partitions may be associated with the event partitions that include the event records used for generating the summarization information included in each summary partition. Further, the indexers may respond to stats queries using summarization information even if their associated event partitions have been deleted or moved. In such cases, the indexers may generate a responsive partial result set based on the summarization information stored in its summary partitions.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include indexer server device 112, search head server device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, indexer server device 112 may include module, processes, components, services, or the like, for receiving and indexing event records, responding to queries, managing event partitions, managing summary partitions, and the like. Further, in at least one of the various embodiments, search head server device 114 may include processes, modules, services, components, or the like, for managing queries, managing query results, identifying indexers that maybe responsive to queries, responding to queries, configuring and administering indexers and indexer clusters, and the like. In at least one of the various embodiments, indexer server device 112 may employ extraction rules if indexing events, event records, or other forms of data and/or machine data. Both indexer server device 112 and search head server device 114 may perform actions further described in conjunction with FIGS. 5-11.

Also, in at least one of the various embodiments, enclosure of blade serves 110, enclosure of enclosure of server computers 116, super computer network device 118 may include network devices that perform the actions of indexer server device 112 and search head server device 114.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (Wi-Max), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, LTE and the like.

Enclosure of Blade Servers

Figure 2A:
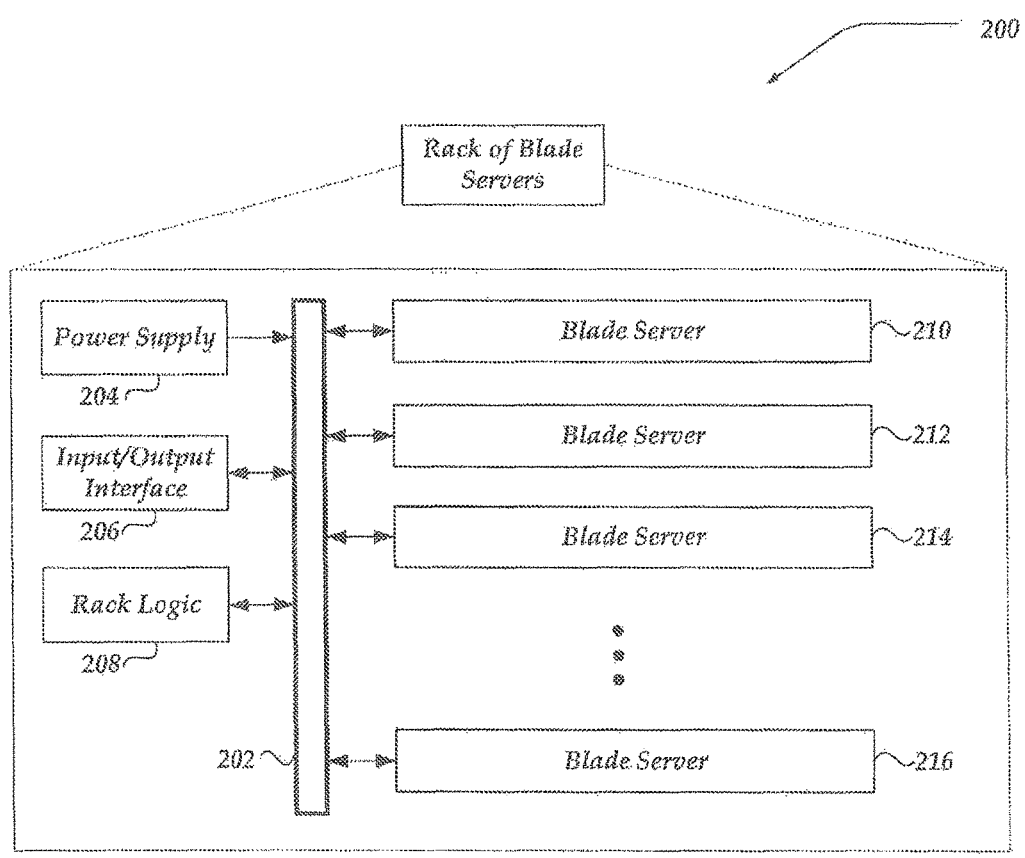
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
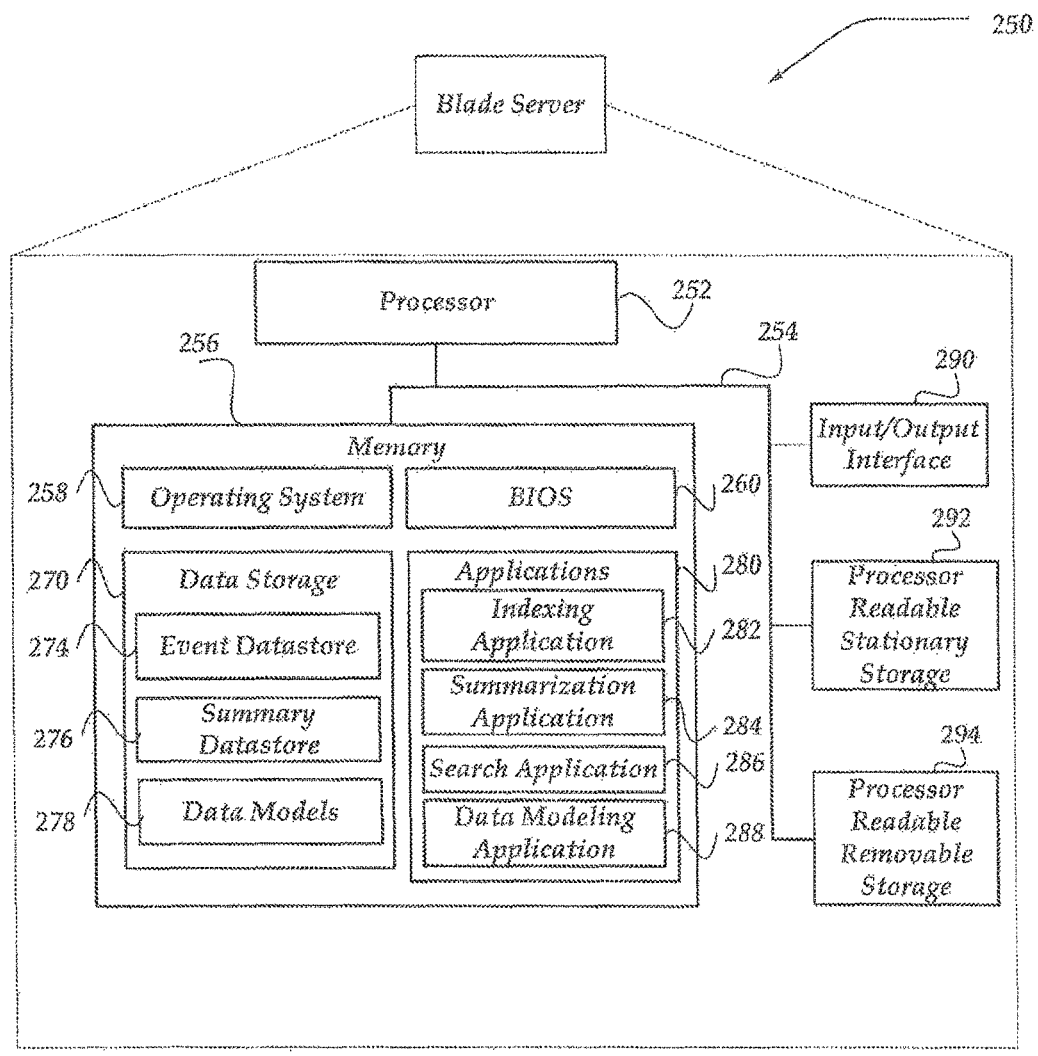
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 5-11. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, event datastore 274, summary datastore 276, data models 278, or the like. Event datastore 274 may contain event records, event partitions, and other supporting data. Likewise summary datastore 276 may contain summarization information, summarization tables, summary partition, and other supporting data. And, data models 278 may contain the data models and supporting data.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, indexing application 282, summarization application 284, search application 286, data modeling application 288 which may be enabled to perform actions further described below in conjunction with FIGS. 5-11.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
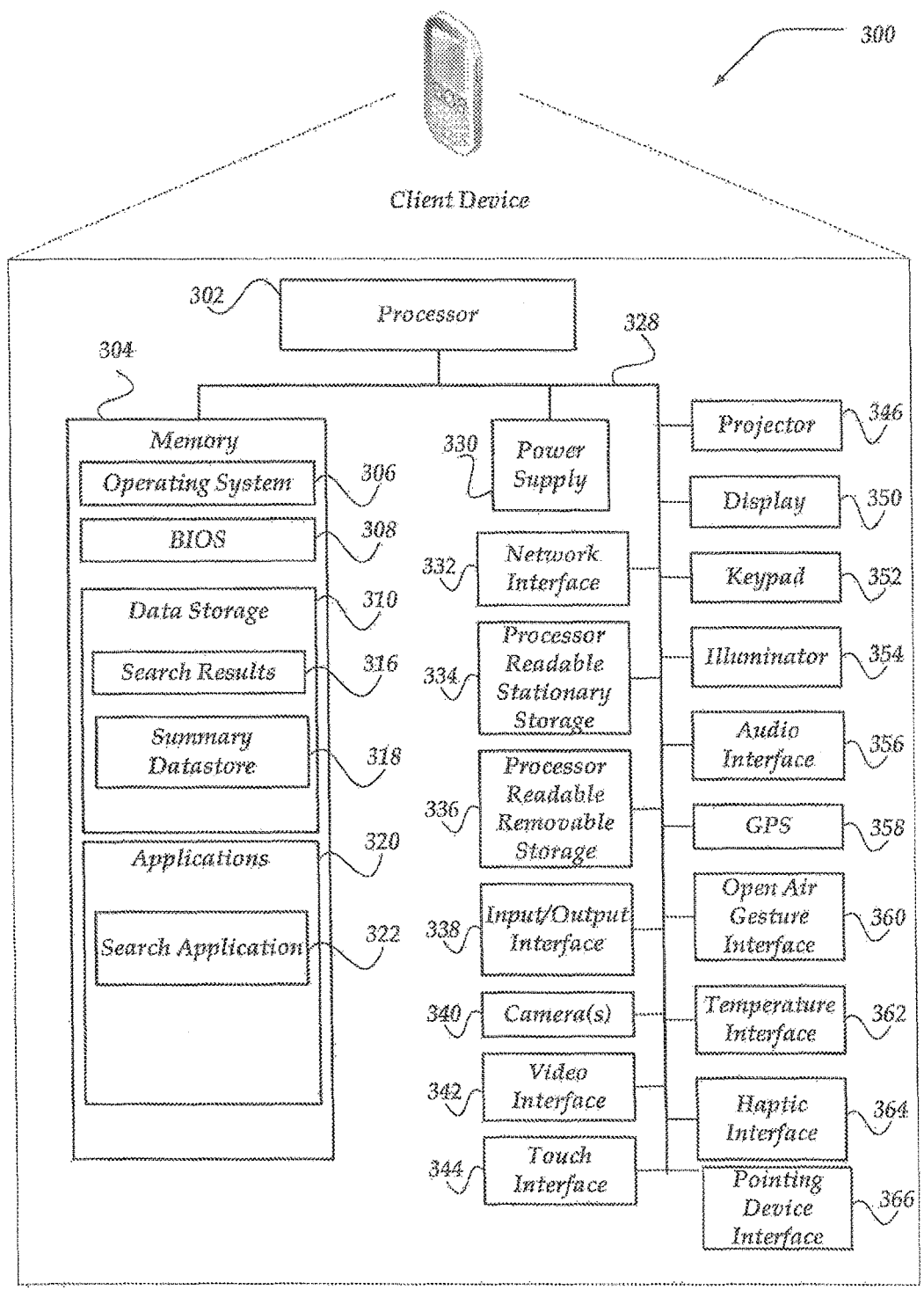
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device. Data storage 310 may include, for example, search results 316, or summary datastore 318.

Applications 320 may include computer executable instructions which, when executed by mobile device 300, transmit, receive, and/or otherwise process instructions and data. Applications 320 may include, for example, search application 322. In at least one of the various embodiments, search application 322 may be used to submit communications to search head server device 114 and/or indexer server device 112, including, but not limited to, queries, searches, or the like. Also, search application 322 may be used to receive communications from search head server device 114 and/or indexer server device 112, including, but not limited to, responses to queries, search results, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
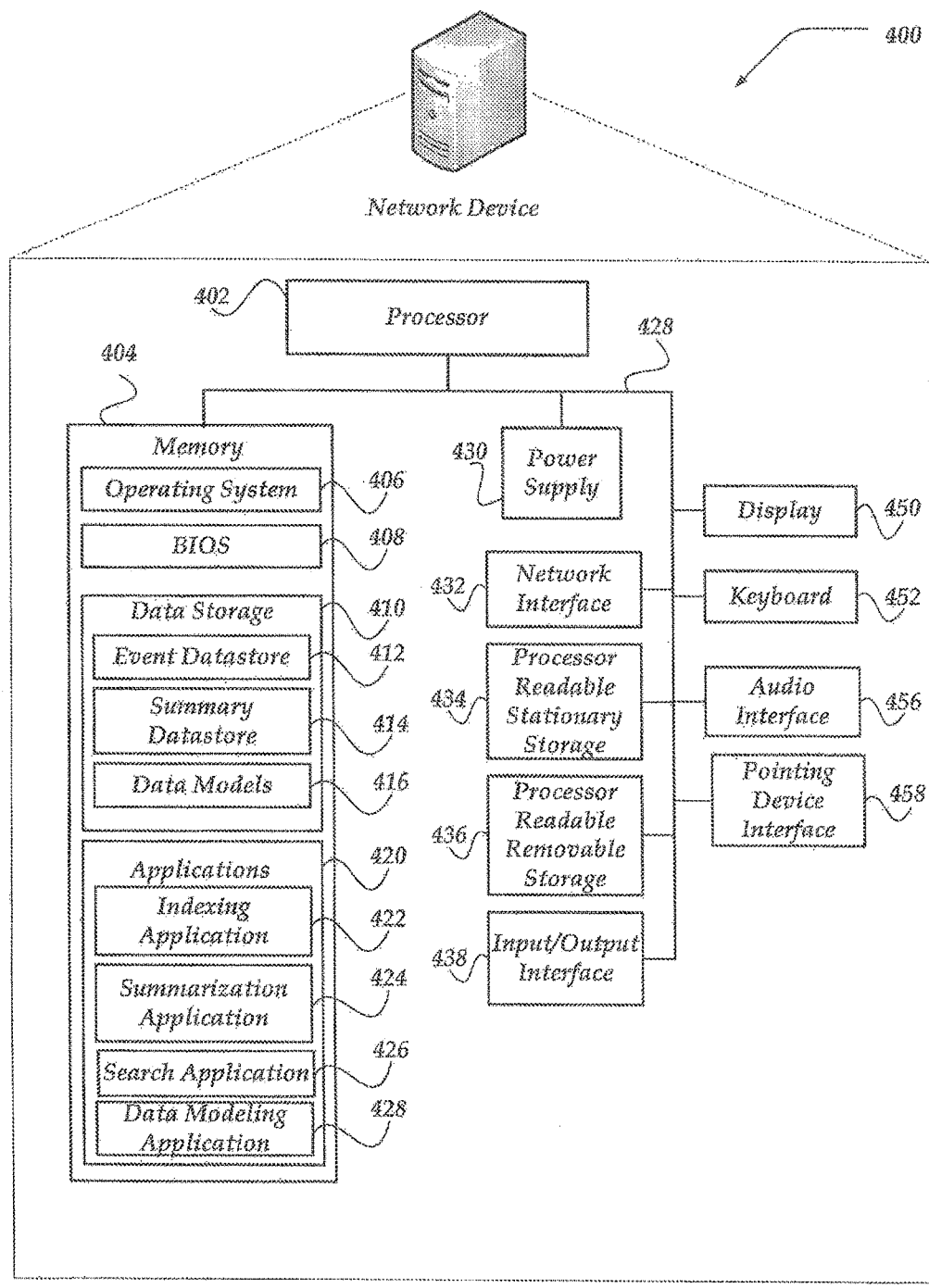
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions such as those action describe in conjunction with FIGS. 5-11. In one embodiment, at least some of datastore 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, event datastore 412, summary datastore 414, or data models 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include indexing application 422, summarization application 424, and search application 426 which may be enabled to perform actions further described below in conjunction with FIGS. 5-11. In at least one of the various embodiments, while they may be illustrated here as separate applications, indexing application 422, summarization application 424, search application 426, or data modeling application 428 may be implemented as modules and/or components of the same application. Further, in at least one of the various embodiments, indexing application 422, summarization application 424, search application 426, or data modeling application 428 may be implemented as operating system extensions, modules, plugins, or the like.

Illustrative Architecture for Transparent Summarization of Events

Figure 5:
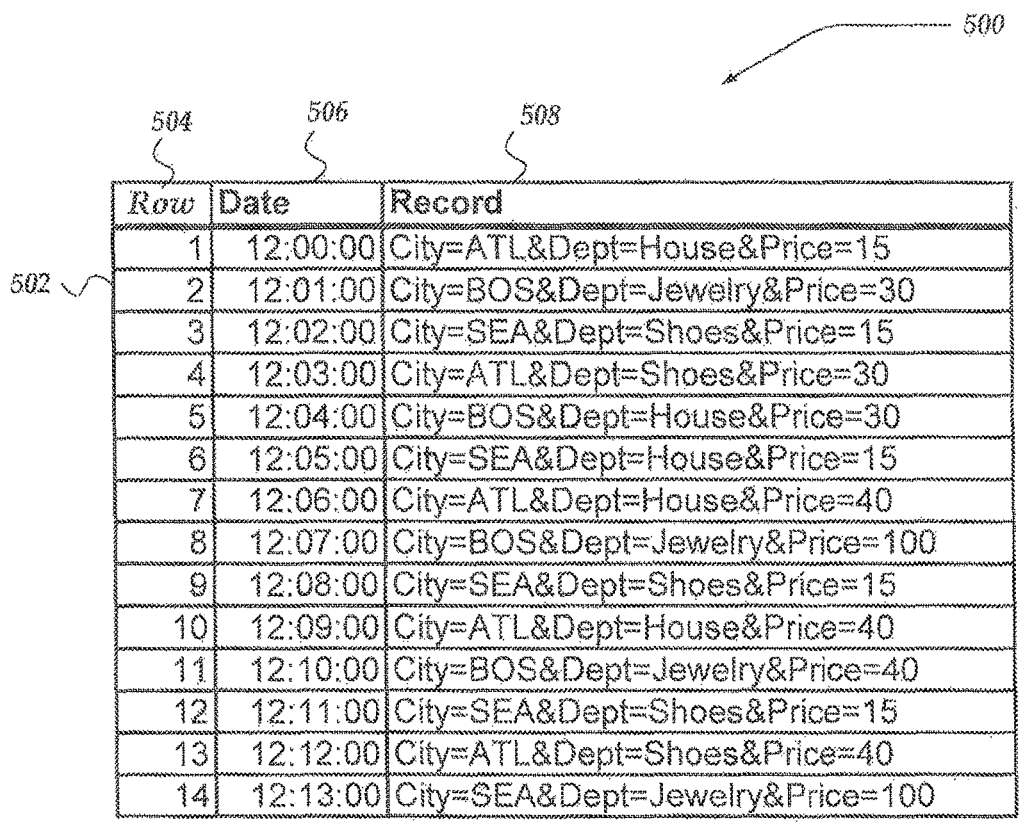
FIG. 5 illustrates a portion of event records in accordance with at least one of the various embodiments.
Figure 7:
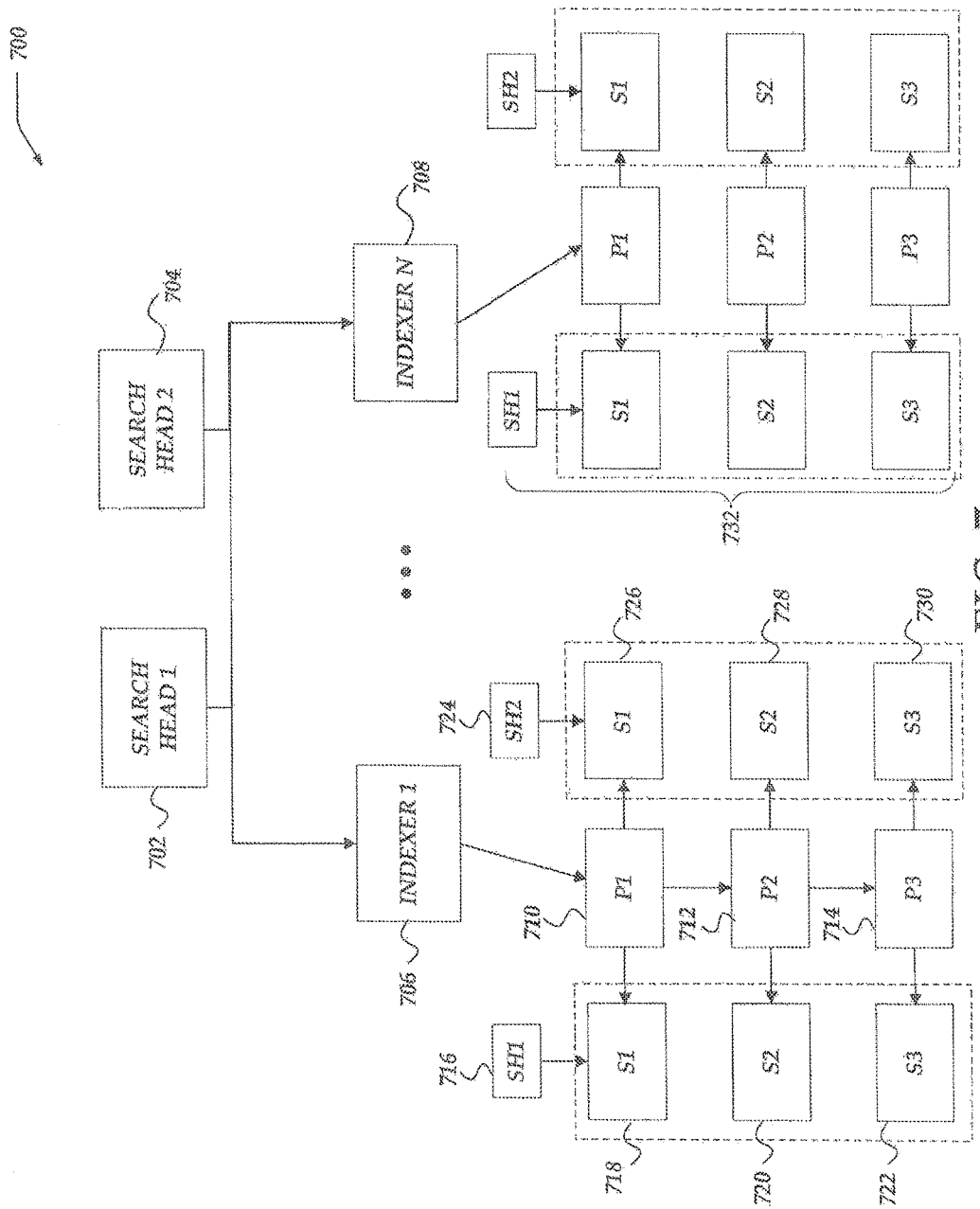
FIG. 7 illustrates a portion of a logical architecture for summarization of events in accordance with at least one of the various embodiments.

FIGS. 5-7 represent portions of a logical architecture and/or data structures for transparent summarization of events in accordance with at least one of the various embodiments.

FIG. 5 shows an embodiment of datastore 500 that is containing event records. Datastore 500 may be representative of the event records stored in event partitions such those described in conjunction with FIG. 7. Datastore 500 should be considered to be a non-limiting example provided to simplify the discussion of related elements of the claimed innovations. While production embodiments may employ one or more datastores having more or less complexity, datastore 500 as depicted, is sufficient to disclose and describe the various innovations claimed herein of the claimed the subject matter to at least one of ordinary skill in the art.

In at least one of the various embodiments, datastore 500 may be located on servers such as indexer server device 112. In some embodiments, datastore 500 may be stored in event data storage 274 on devices such as blade server 200, event datastore 412 on network devices such as network device 300, or the like. And, more particularly, in at least one of the various embodiments, datastores, such as datastore 500 may be stored in event partitions on (or associated with) indexers.

In at least one of the various embodiments, datastore 500 may be arranged to include at least the following columns: row 504, date 506, and record 508. In at least one of the various embodiments, datastore 500 may be implemented as a text file (log file), binary file (e.g., compressed and/or encrypted), database table, or the like. Embodiments may include more or less columns than as depicted in FIG. 5.

In at least one of the various embodiments, row column 504 may indicate the location/position of each event record in datastore 500. In at least one of the various embodiments, record position may be indicated explicitly using a column, such as, row column 504. In other embodiments, record position may be determined based on the order the event records may be positioned in the datastore. In some embodiments, a position value for an event record may be determined after an indexer application has filtered and/or sorted the event records.

Date column 506, in at least one of the various embodiments, may include the time and date (e.g., timestamp) associated with the event records in datastore 500. In at least one of the various embodiments, timestamps may be generated by the indexing server, or they may be included with the event record and extracted as it is received by the indexers. Further, in at least one of the various embodiments, date column 506 may be included within record column 508 rather pulled out into a separate column.

In at least one of the various embodiments, record column 508 may comprise the bulk of the contents of the event record. In at least one of the various embodiments, an event record may include a number of different fields and field values. Also, in at least one of the various embodiments, a variety of field and record delimiters may be employed depending on the format and source of the event record. Embodiments may parse the event records to identify and/or extract fields and values based on configuration files, extraction rules, regular expressions, parsers, filters, or the like. In at least one of the various embodiments, the parsing methods may be selected based on the data source, format, purpose, namespace, or the like.

As discussed above, event records may be found in various formats in accordance with the various embodiments. However, the non-limiting example depicted in datastore 500 is sufficient to disclose the at least one of the various embodiments and the subject matter claimed herein. In the description that follows, examples referring the event records depicted in datastore 500, represent records of purchases that may have been made at a retail store and recorded in a machine (e.g., point-of-sale device) generated log file. In this example, datastore 500 includes event records that have fields delimited by ampersands ('&') and values assigned the fields using the equals sign ('=').

For example, event record 502 has a row value of "2" because it is the second row in datastore 500 (e.g., this may indicate that it was the second row received by an indexing server). Also, in this example, event record 502 has a date value of 12:01:00. The record column for event record 502 includes the string/text value of "City=BOS&Dept=Jewelry&Price=30" In many of the examples used included in this description, event record 502 may be read as representing a purchase of jewelry from a store located in Boston having a price of $30.

One of ordinary skill in the art will appreciate that other field collections and record formats may be used depending on the source of the event records, reasons for collecting the event records, or the like.

In at least one of the various embodiments, the field names may have been originally stored or located separately from the field values for each event record using a header that defines field/column names, or the like. For example, if the text reads "BOS, Jewelry, 30", datastore 500 may be configured to associate the comma-separated values with field names based on the position the of value (e.g., first field is City, second field is Dept, and third field is Price). Also, in at least one of the various embodiments, the field names may be programmatically inferred and/or determined from other information provided in the original source(s) of the event record that may be separate from the field values, such as, reference values that may point other data locations where the field name may be located, such as, lookup tables, database tables, or the like.

Also, in at least one of the various embodiments, the data sources may provide event records using a structured data format, such as XML, JSON, YAML, or the like, that enable field names to be associated with field values.

In any event, the non-limiting examples in this description based on datastore 500 are sufficient to disclose and enable the various embodiments to one of ordinary skill in the art.

FIG. 6 illustrates at least a portion of summarization table 600 in accordance with at least one of the various embodiments. In at least one of the various embodiments, summarization table 600 may be an example of a summarization table for the event records in datastore 500 and while it is non-limiting, it is sufficient to disclose the various embodiments and innovations included in this description. In at least one of the various embodiments, summarization table 600 may be referred to as a lexicon.

Briefly, in at least one of the various embodiments, summarization tables may be generated from event records by a summarization application, such as summarization application 284, or summarization application 424. Using a summarization table, various queries and searches may be optimized such that result may be produced without re-indexing or rescanning the event records. In at least one of the various embodiments, summarization tables such as summarization table 500 may be employed to improve group-by queries, aggregates queries, or the like. In at least one of the various embodiments, the specific fields included in a summarization table may be responsive to the particular details of the collection queries employed to generate the summarization information that includes the summarization table.

In at least one of the various embodiments, summarization table 600 may include at least two columns, Field::Value 602 and Posting 604. In at least one of the various embodiments, Field::Value 602 includes field names and field values that may be generated by the indexing server from event records. In at least one of the various embodiments, the field name and field value may be separated by delimiters such as, '::', ';', '++', or the like. In the non-limiting example of summarization table 600, double colons ('::') are used to separate the field name from the field value.

In at least one of the various embodiments, Posting column 604 may include posting values of event records that include the corresponding field names and field values. In at least one of the various embodiments, the posting values may reference locations in event partitions where the corresponding event records may be found. In at least one of the various embodiments, the posting values may be sorted in ascending order.

For example, at row 606 of summarization table 600, Field::Value column 602 contains "City::ATL" which may represent the field named City having the field value of ATL (e.g., Atlanta). The posting values (Posting column 604) corresponding to "City::ATL" may be 1, 4, 7, 10, and 13. Referring to FIG. 5, these posting values correspond to rows 1, 4, 7, 10, and 13 in datastore 500, with each event record including at least the string fragment "City=ATL".

Likewise, at row 608, in this example, Field::Value column 602 contains "Dept::House" which may represent the field named Dept (e.g. Department) having a field value of House (e.g., Housewares). The posting values for "Dept::House" in this example are 1, 5, 6, 7, and 10. Referring again to FIG. 5, these posting values correspond to rows 1, 5, 6, 7, and 10, each including the string fragment "Dept=House" in datastore 500.

Further, at row 610, in this example, Field::Value column 602 contains "Price::15" which may represent the field named Price having a field value of 15 (e.g., $15). The corresponding posting values for "Price::15" may be 1, 3, 6, 9, and 12. These posting values correspond to rows 1, 3, 6, 9, and 12, each including the string fragment "Price::15" in datastore 500.

In at least one of the various embodiments, summarization tables, similar in organization to summarization table 600, may be generated by summarization application 284 and/or summarization application 424. Also, in at least one of the various embodiments, summarization tables, such as summarization table 600 may be employed by search application 286 and/or search application 426 for searching event summaries and/or resolving stats queries. Also, in at least one of the various embodiments, summarization tables may be stored in summary partitions associated and/or linked to a event partition and stored on, or associated an indexer.

In at least one of the various embodiments, summarization table 600 may be arranged using a variety of well-known data structures including, but not limited to, the structure depicted in FIG. 6. Summarization table data structures may include more or less columns and/or the columns may be arranged differently. Also, in at least one of the various embodiments, summarization tables may incorporate compression methods, such as run-length-encoding, or the like, to reduce storage size. Also, in at least one of the various embodiments, summarization tables, such as summarization table 600 may employ encryption to prevent unauthorized access to the contents.

One of ordinary skill in the art will appreciate that summarization table 600 is a non-limiting example that is sufficient to disclose and enable the various embodiments and the claimed innovations.

FIG. 7 illustrates logical architecture 700 for generating and searching event summaries in accordance with at least one of the various embodiments.

In at least one of the various embodiments, event records may be collected by one or more indexer server devices, such as, indexer server device 112. Indexer server devices may include one or more indexing applications, such as, indexing application 282 and/or indexing application 422. These applications may receive event records and store them in one or more indexes, event partitions, or datastores. In at least one of the various embodiments, indexers may be arranged in clusters such as indexers 706, and 708 are depicted. In at least one of the various embodiments, indexers 706, and 708 may be receiving and indexing data from the same, separate, or different data sources (not shown). Indexers such as indexer 706 and indexer 708 may be embodiments of indexer server device 112, blade server 250, network device 400, or the like. A plurality of indexers arranged as a computing cluster may enable indexing of event records to occur in parallel for improved throughout and indexing capacity. Thus, in at least one of the various embodiments, event records may be allocated among the one or more indexers using one or more well-known data partitioning and/or sharding techniques, such as key-based partitioning, or the like. The particular data partitioning method being used, including any associated partitioning rules may be defined in configuration information stored in a configuration file, received from a user, stored in a database, or the like.

In at least one of the various embodiments, indexers, such as indexer 706, and indexer 708, may be arranged to receive event records and store them in event partitions, such as, event partition 710, event partition 712, and event partition 714. Event partitions may be configured to have a defined data storage capacity for storing event records and any associated meta-data. As event partitions begin to fill up, or are otherwise to a defined threshold of data storage, additional event partitions may be generated (allocated) and associated with the same indexer for receiving additional event records. For example, if event partition 710 is defined as having a data storage capacity of 100 megabytes (MB), as event partition 710 gets close to holding 100 MB of event record data, an indexer application may create another event partition such as event partition 712.

In at least one of the various embodiments, each indexer may have its own corresponding set of associated partitions.

For example, indexer 708 is shown as having a plurality of partitions 732 that include event partitions (P1, P2, P3) for storing event records it has received.

In at least one of the various embodiments, event partitions, such as, event partition 710 may be associated with a time range that has a defined start time and a defined stop time. In at least one of the various embodiments, an event partition may be configured to include event records that were received by or from a data source within the time range associated with the event partition.

In some embodiments, the time range associated with an event partition may be a function of the included event records. For example, in at least one of the various embodiments, for a given event partition, the timestamp of the earliest-in-time event record may establish the start of the time range and the timestamp of the latest-in-time event record may be used to establish the end of the time range. In at least one of the various embodiments, event partitions that have defined storage capacity limits, including limits defined by a maximum record count, may use time ranges based on the timestamps associated with their included event records.

Further, in some embodiments, timestamps for event records may be determined based on the time the event records are received or they may be based on values extracted from the contents of event records themselves. In at least one of the various embodiments, extraction rules, configuration information, or the like, may be used determine the method for determining the timestamp for event records.

In at least one of the various embodiments, if an event partition gets near to exceeding its capacity, in size, record count, or time range, a new partition may be generated to receive more event records. In at least one of the various embodiments, if the next event record (and any associated meta-data) received by an indexer would cause an event partition to exceed a capacity threshold another event partition may be generated and initiated for storing event records.

In at least one of the various embodiments, search head 702 and search head 704 may be a logical command center for receiving commands from users, processing automatic/scheduled commands (including queries), indexer server device administration, or the like. In at least one of the various embodiments, the logical structure and services of search head 702 and search head 704 may be provided by search application 286, and/or search application 426, either of which may be operating on network device 400, blade server 250, or the like. Further, search head 702 and search head 704 may receive commands and/or other input provided from client search application 322, or the like, operating on a client device such as client device 300.

In at least one of the various embodiments, search head 702 and search head 704 may include user-interfaces and processes for initiating queries directed towards event records stored and/or located on event partitions on one more indexers (e.g., indexer 706, indexer 708, or the like). Queries may be initiated by users, external systems, client devices, or the like, and/or they may be predefined queries that may be configured to run on a defined schedule and/or if one or more defined conditions have been met.

In at least one of the various embodiments, there may be plurality of search heads, more or less than are illustrated in FIG. 7.

In at least one of the various embodiments, some queries may be arranged to initiate collection operations (collection queries). Collection operations may be employed to generate summarization information based on event records stored in event partitions. This summarization information may include one or more summarization tables, such as similar to summarization table 600.

In at least one of the various embodiments, summarization information generated during collection operations may be stored in summary partitions that correspond to the event partitions containing the event records used to generate the summarization information.

In at least one of the various embodiments, queries, including collection queries that initiate a collection operation, may provide a namespace value that is used by a summarization application, such as summarization application 284, and/or summarization application 424 for referencing the permissions, extraction rules, event records, field definitions, summarization information, or the like, that may be associated with the collection operation.

In at least one of the various embodiments, a unique identifier for the summarization information generated from and/or corresponding to a query may be created using the namespace value combined with additional information, such as, search head, user identity, time ranges, timestamps, partition identifiers, or the like, or combination thereof. Further, the namespace value may be employed in part to generate a "path" that may be used as a Uniform Resource Identifier (URI), file system path, or the like, for determining where to store and/or locate the summarization information.

In at least one of the various embodiments, queries used for initiating collection operations may include a list of fields that may be included in the summarization information. In at least one of the various embodiments, a collection query may include commands for summarizing all of the known fields associated with a namespace, or in some embodiments a list of one or more fields may be included with the query.

In at least one of the various embodiments, a collection operation may begin with a query originating at a search head, such as, search head 702 and/or search head 704. In at least one of the various embodiments, search head 702 and/or search head 704 may forward the collection query to one or more indexers that may include event records responsive to the collection query. In at least one of the various embodiments, if more than one relevant indexer is available, the collection query may be forwarded to each indexer for concurrent execution on each relevant indexer.

In at least one of the various embodiments, responsive to being provided a collection query, an indexer may execute the collection query against the event records that are contained in its event partitions. Parameters included with the collection query may be used by applications, such as, summarization application 424 and summarization application 284 to determine which event partitions may contain event records responsive to the collection query. For example, if event partition 712 includes event records received during the 24 hour period starting at Jan. 14, 2013 Midnight and ending at Jan. 14, 2013 11:59 p.m., a collection query that includes terms to limit the query to event records received between Jan. 14, 2013 8:00 a.m. and Jan. 14, 2013 5:00 p.m. will execute against event partition 712 and will omit event records stored in event partition 710 and event partition 714. Also, some collection queries may execute on multiple event partitions that are available on an indexer. For example, a collection query such as "collect * . . . where namespace=flights" may be interpreted as directing a summarization application to generate summarization information for all available event records in every available event partition as long as the event records are associated with the namespace flights. Also, this example at least is sufficient to disclose and enable the claimed innovations. And, one of ordinary skill in the art will appreciate that other well-known and/or custom query languages and query terms may be supported by at least one of the various embodiments.

In at least one of the various embodiments, summarization information generated in response to a collection query may be stored in summary partitions associated with the event partitions that contain the event records used to generate the respective summarization information. For example, in FIG. 7, summary partition 718 is associated with event partition 710; summary partition 720 is associated with event partition 712; and summary partition 722 is associated with event partition 714. Thus, the summarization information included in each summary partition may be comprised of data generated from the event records stored in their associated event partition.

In at least one of the various embodiments, additional data such as, namespaces, namespace meta-data, extraction rules, configurations, or the like, located separate from the associated event partition may be optionally be used during the generation of the summarization information. Such data may be stored or referenced from within a summary partition even if that data is not contained in the associated event partitions. For example, functions, templates, code libraries, data type information, or the like, that may be located in storage separate from an event partition may also be used when generating summarization information.

In at least one of the various embodiments, the summarization partitions may be considered peers of the event partitions and they may be located physically and/or logically separate from event partitions. In at least one of the various embodiments, summary partitions and event partition may share the same physical and/or logical storage partitions. In such embodiments, well-known techniques using meta-data, data structures, or the like, may be employed to maintain the necessary logical distinctions and relationships of summary partitions and event partitions.

In at least one of the various embodiments, summarization partitions may be arranged such that they may be associated with the particular search head where the collection query originated. Search head scope 716 may be a data structure that scopes summarization partitions 718-722 to queries that originate from search head 702. Likewise, search head scope 724 may scope summarization partitions 726-730 to queries that originate from search head 704.

In at least one of the various embodiments, scoping the summarization partitions to a search head enables each search head to generate summarization information for searches that may otherwise be the same except for starting at different search heads. This at least enables searches to execute using different extraction rules and/or configurations that may be associated each respective search head.

In at least one of the various embodiments, each indexer may maintain its own set of summary partitions corresponding to its event partitions. For example, indexer 708 has partitions 732 which include event partitions and summary partitions. The summarization information stored in partitions 732 is based on data and event records from event partitions associated with indexer 708.

In at least one of the various embodiments, search head 702 and search head 704 may also be the starting point for stats queries that are directed towards the event records stored on the indexers. Similar to how search head 702 and search head 704 determine which indexes to forward collection queries, search head 702 and search head 704 may determine which indexers to forward each stats query. In at least one of the various embodiments, search head 702 and search head 704 may forward stats queries to each indexer and rely on the indexers to determine if they may contain event records responsive to the stats query.

In at least one of the various embodiments, if an indexer receives a stats query, a search application, such as search application 286 and/or search application 426 may parse the query to determine the event partitions on an indexer contain event records relevant to the stats query, if any. Also, the search application may determine if there is summarization information responsive to the stats query.

In at least one of the various embodiments, responsive summarization information may be identified by examining various parts of the stats query, including, namespace, field names, aggregate functions, group-by clauses, or the like. In at least one of the various embodiments, of significant importance is whether a relevant summarization table is available that includes the fields in the stats query. In at least one of the various embodiments, if the stats query can be answered from a summarization table then performance may be improved because the search application may not have to scan the event records.

Collection queries may be executed to generate summarization information in anticipation of the fields that stats queries may include. For example, by reviewing the event records in the datastore 500, a user could see that fields City, Dept, and Price are common to these event records. In anticipation of stats queries related to those fields, the user may execute a collection query that creates a summarization table that includes the fields of interest (City, Dept, and Price). See, summarization table 600 for a non-limiting example of at least one of the various embodiments. Now, for this example, many stats queries regarding the event records in datastore 500 may be answered directly from summarization table 600.

For example, if a stats query includes "select count(*) . . . where City=ATL and Dept=House" the search application will determine that the fields City and Dept are in summarization table 600. Using the summarization table, the search application may resolve/answer the query (count=3) without scanning the actual event records. In this example, the stats query may determine the answer by counting the intersection of the posting values for City::ATL and Dept::House. Here, row 606 (City::ATL) holds posting values 1, 4, 7, 10, 13 and row 608 (Dept::House) holds posting values 1, 5, 6, 7, 10 giving an intersection of 1, 7, 10, meaning that three event records match the search. Datastore 500 may be reviewed to confirm that three event records match City=ATL and Dept=House. In contrast, in the absence of summarization table 600, the search application would have to examine and parse each event record to answer the stats query. Thus, in embodiments that store large numbers of event records, performance may be improved if stats queries are resolved using the summarization information rather than scanning the event records each time.

In at least one of the various embodiments, collection queries used to generate the summarization information may omit one or more fields from the summarization table. If a stats query includes fields omitted from the summarization table, the event records may need to be scanned to answer the stats query even if some of the fields were previously summarized by a collection query.

In at least one of the various embodiments, more than one indexer may have event records and summarization information responsive to a stats query. In this case, the search head may forward the stats query to each indexer that may contain relevant records. In response, each indexer may individually determine an answer (resolve the query) based on the data included in the summary partitions and event partitions located and/or associated with the indexer. The determined answers may be one or more partial result sets that may be returned to the search head that forwarded the stats query, such as, search head 702. If responses from multiple indexers are received, the search head may combine the partial result sets into a single result set. For example, using the stats query "select count(*) . . . where City=ATL and Dept=House", if indexer 704 returns a result of "count=3" and indexer 706 returns a result of "count=7" the search head may return a ultimate result of "count=10" based on combining the two partial result sets that were generated by the individual indexers.

Furthermore, data, records, events records, partitions, summaries, or the like, described as being located and/or stored on an indexer or search heads may actually be stored in data storage (e.g., disk drives, NAS, cloud storage, or the like) allocated and/or accessible by the indexers without limitation rather than being limited to data storage physically enclosed, or attached to the network devices the are operative as indexers and/or search heads.

In at least one of the various embodiments, queries generated by the search head may be generated using one or more data models. In at least one of the various embodiments, data models may be employed to model the event records received and/or indexed by the indexer server. In at least one of the various embodiments, search objects built from a data model may be employed to generate collection queries used for generating summarization information. In at least one of the various embodiments, if search objects are used for queries, the components, terms, fields, expressions, or the like, for the queries may be generated from the search object and the data model. In at least one of the various embodiments, data model applications, such as data model application 428, and data model application 288, may employ at least the architecture and perform actions as described in conjunction with FIGS. 12-15. Search objects may be provided to a search head and/or to the one or more indexers determined for resolving the query.

Generalized Operation

FIGS. 8-11 represent the generalized operation of summarization event in accordance with at least one of the various embodiments. In at least one of the various embodiments, processes 800, 900, 1000, and 1100 described in conjunction with FIGS. 8-11 may be implemented by and/or executed on a single network device, such as network device 400 of FIG. 4. In other embodiments, these processes or portions of process thereof may be implemented by and/or executed on a plurality of network devices, such as network device 400 of FIG. 4. In yet other embodiments, these processes, or portions thereof, may be implemented by and/or executed on one or more blade servers, such as blade server 250 of FIG. 2B. However, embodiments are not so limited and various combinations of network devices, blade servers, or the like may be utilized.

Figure 8:
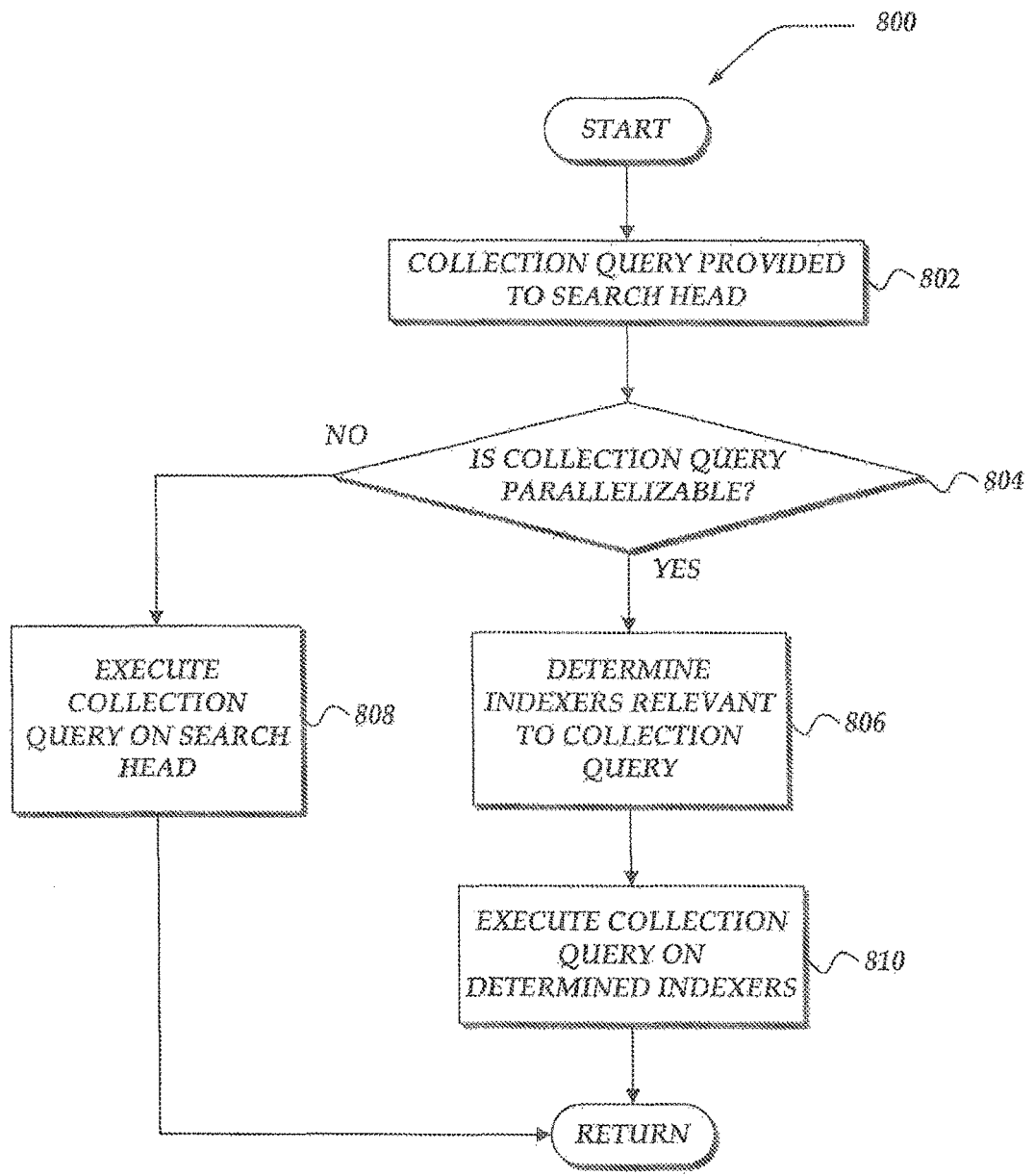
FIG. 8 shows a flowchart for a process for summarizing events in accordance with at least one of the various embodiments.

FIG. 8 shows a flowchart for process 800 for summarizing events in accordance with at least one of the various embodiments. In at least one of the various embodiments, after a start block, at block 802, a collection query may be provided to a search head. In at least one of the various embodiments, the collection query may be provided by a user via a user-interface, received over machine interface or API, or the like. Further, in at least one of the various embodiments, the collection query may be a saved query scheduled to execute periodically and/or on the occurrence of another condition.

Next, at decision block 804, the collection query may be examined to determine if the collection query may be parallelizable. In at least one of the various embodiments, if the collection is parallelizable, the collection query may be concurrently executed on more than one indexer and control may flow to block 806. Otherwise, in at least one of the various embodiments, control may flow to block 808.

At block 806, the indexers relevant to the currently executing collection query may be determined. In at least one of the various embodiments, relevant indexers may be determined by various methods, including but not limited to those discussed in conjunction with FIG. 7. Though briefly, the determination may be made at the search head if the search head is maintaining a catalog or directory of indexers that contain meta-data that may be used to determine the set of indexers relevant to the collection query. For example, if the collection query is limited to a particular namespace, such as 'flights', the search head may maintain a list of indexers that have indexed event records associated with the 'flights' namespace. Of course, other well-known cataloging and mapping technique may be employed by the search head.

Alternatively, a decentralized process may be used, such as, in at least one of the various embodiments, the search head may forward the collection query to each indexer that the search head is associated with and defer to the individual indexers to determine if the collection query is relevant.

At block 808, because the collection query has been determined to be ineligible for concurrent and/or parallel processing at the indexers, the search head may execute the collection query on the search head itself. In at least one of the various embodiments, generally, the search head may retrieve event records and possibly summarization information from one or more of the indexers and generate summarization information responsive to the collection query and store it in a partition on the search head.

In at least one of the various embodiments, the search head may generate summarization information as event records are received. The search head (via summarization application 284 or summarization application 424, or the like) may track the time value corresponding to when event records are received as index-time value. In at least one of the various embodiments, the index-time value may be employed as a cursor to track which incoming event records may have been summarized.

In at least one of the various embodiments, un-summarized event records may be determined based on their index-time value. The selected portions (chunks) of the un-summarized event records may summarized with the corresponding summarization information stored in a temporary location at the search head. If the selected portion of event records may be summarized without error, the corresponding summarization information may be moved to a summarization partition. In at least one of the various embodiments, this summarization information may be stored/located on summarization partitions on the search head, or on summarization partitions located an indexer.

At block 810, the collection query may be executed on each of the determined indexers. Summarization information generated in response to the collection query may be stored in summary partitions on or associated with each indexer. In at least one of the various embodiments, each summary partition may be linked and/or associated with the respective event partition that contributed event records for the summarization information. Next, control may be returned to a calling process.

Figure 9:
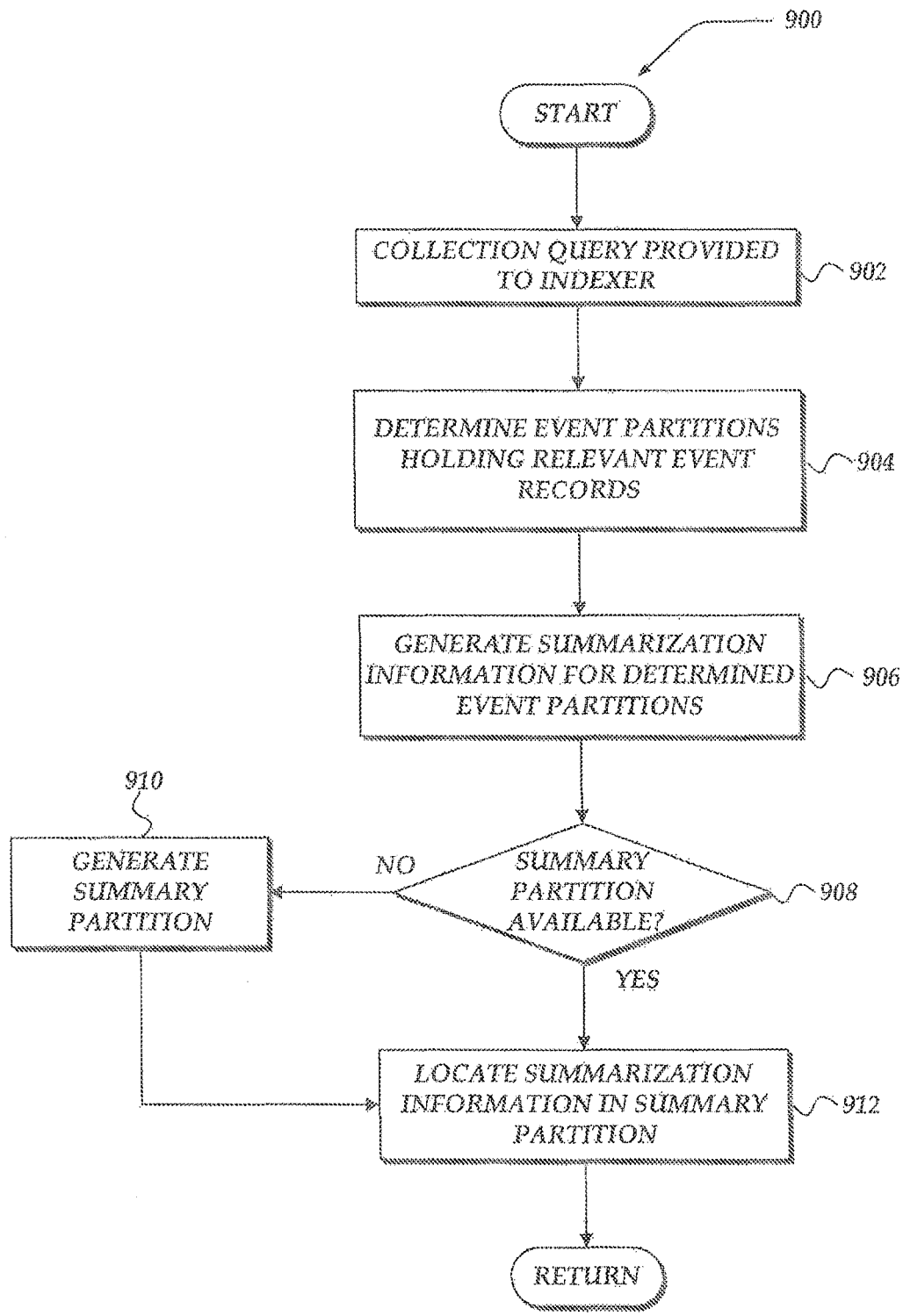
FIG. 9 shows a flowchart for a process for generating summarization information in accordance with at least one of the various embodiments.

FIG. 9 shows a flowchart for process 900 for generating summarization information in accordance with at least one of the various embodiments. After a start block, at block 902, a collection query may be provided to an indexer. Next, at block 904, the event partitions that contain event records relevant to the collection query may be determined.

At block 906, summarization information based on event records in the determined event partitions may be determined. In at least one of the various embodiments, the collection query will include terms and meta-data that may be used to identify the portions of the event records stored in each determined event partition that may be summarized. For example, a collection query may include time ranges, field names, data ranges, patterns, or the like, for including event records and/or portions of event record in the summarization information. Likewise, this type of meta-data may be employed for excluding event records and/or portions of event records from the summarization information.

In at least one of the various embodiments, some event partitions relevant to the collection query may be actively receiving event records. In at least one of the various embodiments, event partitions actively receiving event records may be referred to as hot partitions, and/or hot buckets.

In at least one of the various embodiments, if hot partitions are being processed, the collection application may maintain one or more timestamp values that may be used as cursors for tracking which event records in a hot partition have been summarized. In at least one of the various embodiments, at least one timestamp value may be an index-time value that indicates the time each event record was collected by the indexing system. In at least one of the various embodiments, the index-time value is a generated timestamp that may be different and/or separate from the timestamp used to indicate the time event actually occurred.

In at least one of the various embodiments, event records located in a hot partition may be summarized in chunks of one or more event records. A last-index-time value may be recorded for each chunk of event records summarized. The last-index-time value may correspond to the index-time value of the last event record in the chunk that was summarized. Thus, if subsequent chunks of event records may be selected from the hot partitions, the last-index-time value may used to avoid processing event records that have already been included in the summarization information. As each chunk of event records from a hot partition is summarized the last-index-time value may be updated accordingly.

At decision block 908, if summary partitions are available to store the generated summarization information, control may move to block 912. Otherwise, in at least one of the various embodiments, control may move to block 910.

In at least one of the various embodiments, it is possible that summary partitions associated with the event partitions may be unavailable because this is the first collection query to execute against a particular event partition or the necessary summary partition may be been moved, removed, deleted, or the like.

At block 910, summary partitions for storing the generated summarization information may be generated for the indexer and linked/associated with the event partitions that contributed event records to summarization information.

Next, at block 912, the summarization information may be stored and/or located in summary partition that is associated with the event partition that contributed event records to the summarization information. Further, to at least enable stats queries to reference this summarization information, the summarization information may be tagged or otherwise associated with an identifier. Such an identifier may include the namespace, timestamps, or the like, or combination thereof. Next, control may be returned to a calling process.

Figure 10:
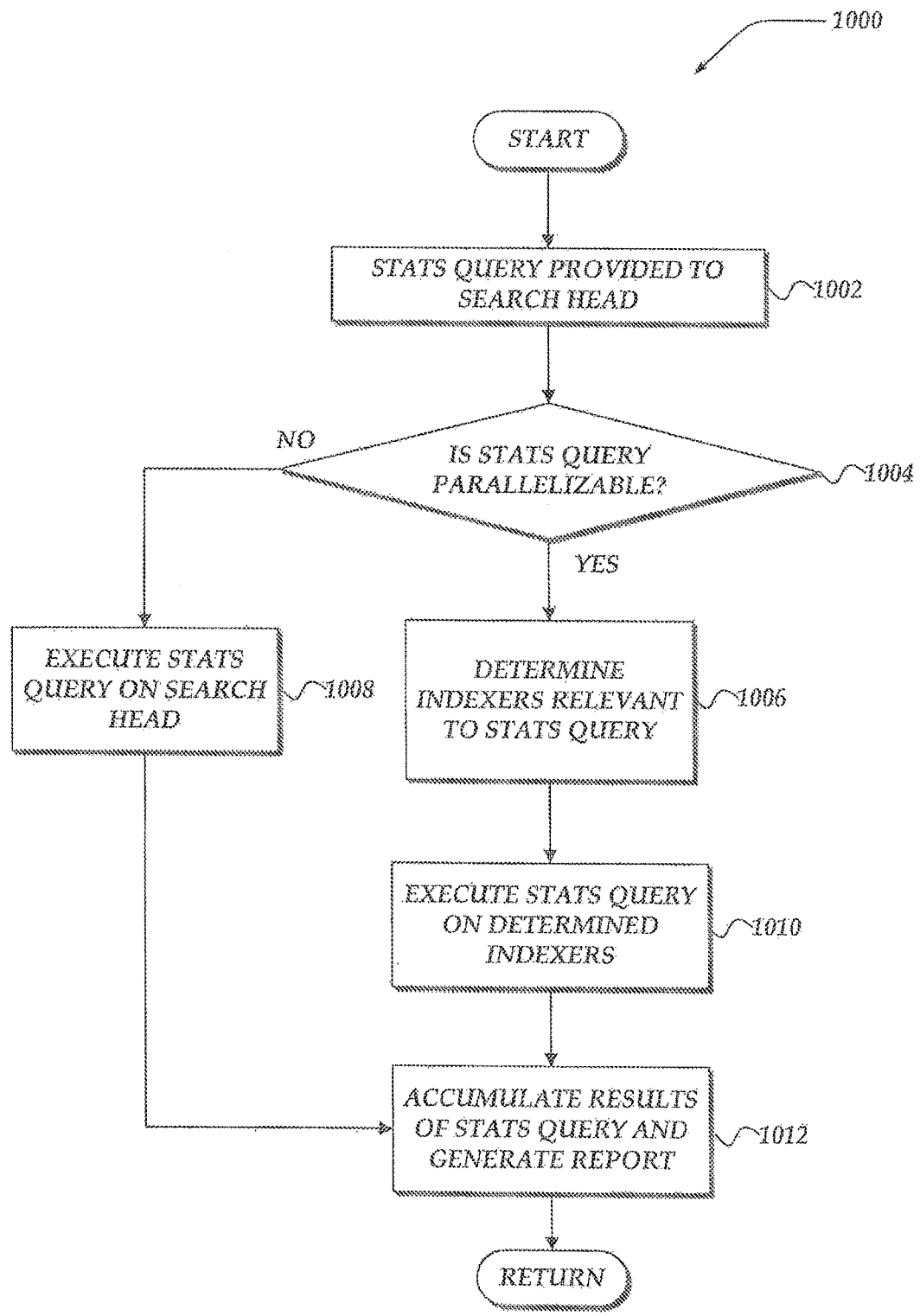
FIG. 10 shows a flowchart for a process for responding to queries using summarization information in accordance with at least one of the various embodiments.

FIG. 10 shows a flowchart for process 1000 for responding to queries using summarization information in accordance with at least one of the various embodiments. After a start block, at block 1002, a stats query may be provided to a search head. In at least one of the various embodiments, the stats query may be provided by a user via a user-interface, received over machine interface or API, or the like. Further, in at least one of the various embodiments, the stats query may be a saved query scheduled to execute periodically and/or on the occurrence of a predefined condition.

At decision block 1004, if it is determined that the stats query is parallelizable, control may move to block 1006. Otherwise, control may move to block 1008.

At block 1006, the indexers relevant to responding to the stats query may be determined. If the indexers are determined, the search head may forward the stats query to the determined indexers. In at least one of the various embodiments, relevant indexers may be determined by various methods, including but not limited to those discussed in conjunction with FIG. 7. Though briefly, the determination may be made by the search head if the search head is maintaining a catalog or directory of indexers that contain meta-data that may be used to determine the set of indexers relevant to the stats query. For example, if the stats query is limited to a particular namespace, such as 'flights', the search head may maintain a list of indexers that have indexed event records associated with the 'flights' namespace. Of course, other well-known cataloging and mapping techniques may be employed by the search head for identifying which indexers to forward the stats query.

Alternatively, in at least one of the various embodiments, the search head may forward the stats query to each indexer that the search head is associated with and let the indexers determine if the stats query is relevant.

At block 1008, since the stats query is not parallelizable the search head may execute the stats query directly. In at least one of the various embodiments, the search head collects the relevant event records from one or more indexers and performs the statistical/aggregation computations on the search head server device.

At block 1010, the individual indexers that receive the stats query may execute the query to produce a partial result set based on the stats query. In at least one of the various embodiments, the partial result set generated by executing the stats query on each indexer may contain results based on the event records stored in event partition and summary partition associated with each individual indexer. For example, for a given stats query, such as, "select count(*) . . . where City=ATL", one of the determined indexers may return 5 while another one of the determined indexers may return 10 for a total of 15.

At block 1012, the search head may accumulate the one or more partial result sets to generate a report. If the stats query was parallelizable, there may be multiple partial result sets contributed by one or more indexers. If so, a search application running on the search head may accumulate the partial result sets provided by each indexer and perform any further processing to generate a complete result set, if any. If the stats query was executed on the search head, one or partial result sets may be produced at the search head and combined into a complete result set as well. Next, control may be returned to a calling process.

Figure 11:
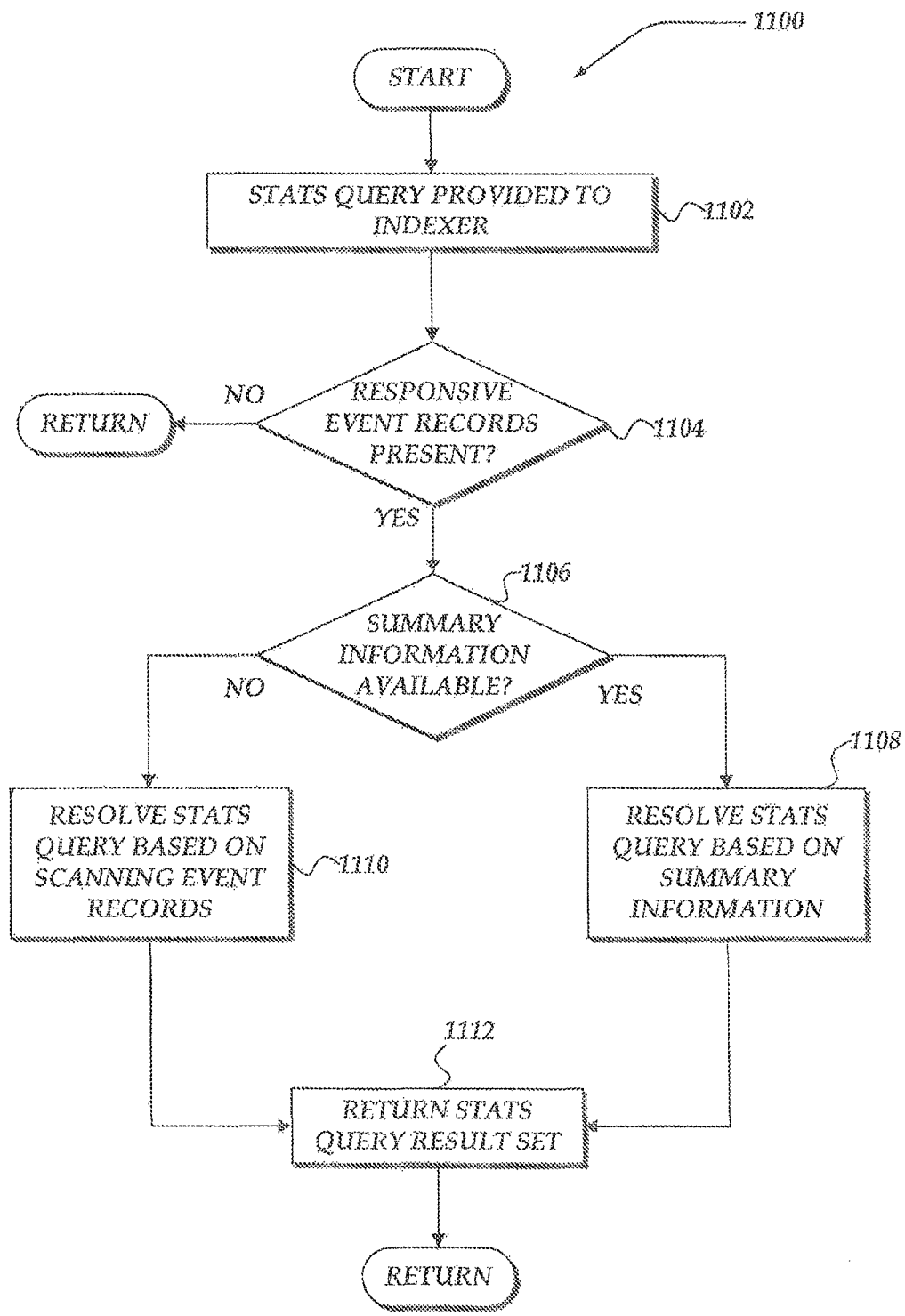
FIG. 11 shows a flowchart for a process for indexers to respond to queries using summarization information in accordance with at least one of the various embodiments.

FIG. 11 shows a flowchart for process 1100 for indexers to respond to stats queries using summarization information in accordance with at least one of the various embodiments. After a start block, at block 1102, a stats query may be provided to an indexer that may have been forwarded by a search head.

At decision block 1104, if the indexer has event records located in its event partitions that may be responsive/relevant to the stats query, control may move to block 1104. Otherwise, control may be returned to a calling process. In at least one of the various embodiments, indexers employ one or more terms included in the stats query to determine if it has event records relevant to resolve the stats query, such as, namespace, data/time ranges, or the like.

Next, at decision block 1106, if summarization information responsive and/or relevant to resolving the stats query is available, control may move to block 1108. Otherwise, control may move to block 1110. In at least one of the various embodiments, if the indexer does not have any event records relevant to resolve the stats query, in at least one of the various embodiments, control may be returned to a calling process. However, in at least one of the various embodiments, even though the event records may have been moved, or deleted, the corresponding summarization information may remain available. In this case, in at least one of the various embodiments, the indexers may retain meta-data regarding the absent event records. In at least one of the various embodiments, the stats query may include a summarization information identifier that resolves to a set of summarization information located on the indexer. If so, this summarization information may be employed absent its contributing event records.

In at least one of the various embodiments, summarization information may further be scoped based on the search head that originated the stats query. A search application may use summarization partitions that correspond to the search head where the query originated to determine relevant summarization information.

At block 1108, the stats query may be resolved/answered by generating a result set responsive the stat query.

At block 1110, because summarization information is unavailable, the stats query may be resolved/answered by directly scanning the event records in one or more event partitions to produce a result set. In at least one of the various embodiments, if event records may be unavailable (e.g., maybe they were deleted) a warning and/or notification that the stats query could not be answered may be generated and returned to the calling process and/or otherwise made available to a user.

In at least one of the various embodiments, if summarization information is unavailable, a collection application may generate on-the-fly summarization information that may be appropriate for answering the provided stats query. Thus, subsequent related stats queries may benefit from the generated summarization information. Configuration settings, and/or commands included in the query may be used to determine is on-the-fly summarization may be active.

At block 1112, the stats query result set may be provided to the search head that initiated the stats query. Next, control may be returned to a calling process.

In at least one of the various embodiments, result sets may be returned using well-known communication protocols and data formats, such as, HTTP, TCP, FTP, HTML, XML, JSON, or the like. One of ordinary skill in the art will appreciate there are numerous ways to provide the results sets to the search head and this disclosure is at least sufficient to disclose the innovations herein.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitory storage media, or the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

Illustrative Data Modeling Architecture

Figure 12:
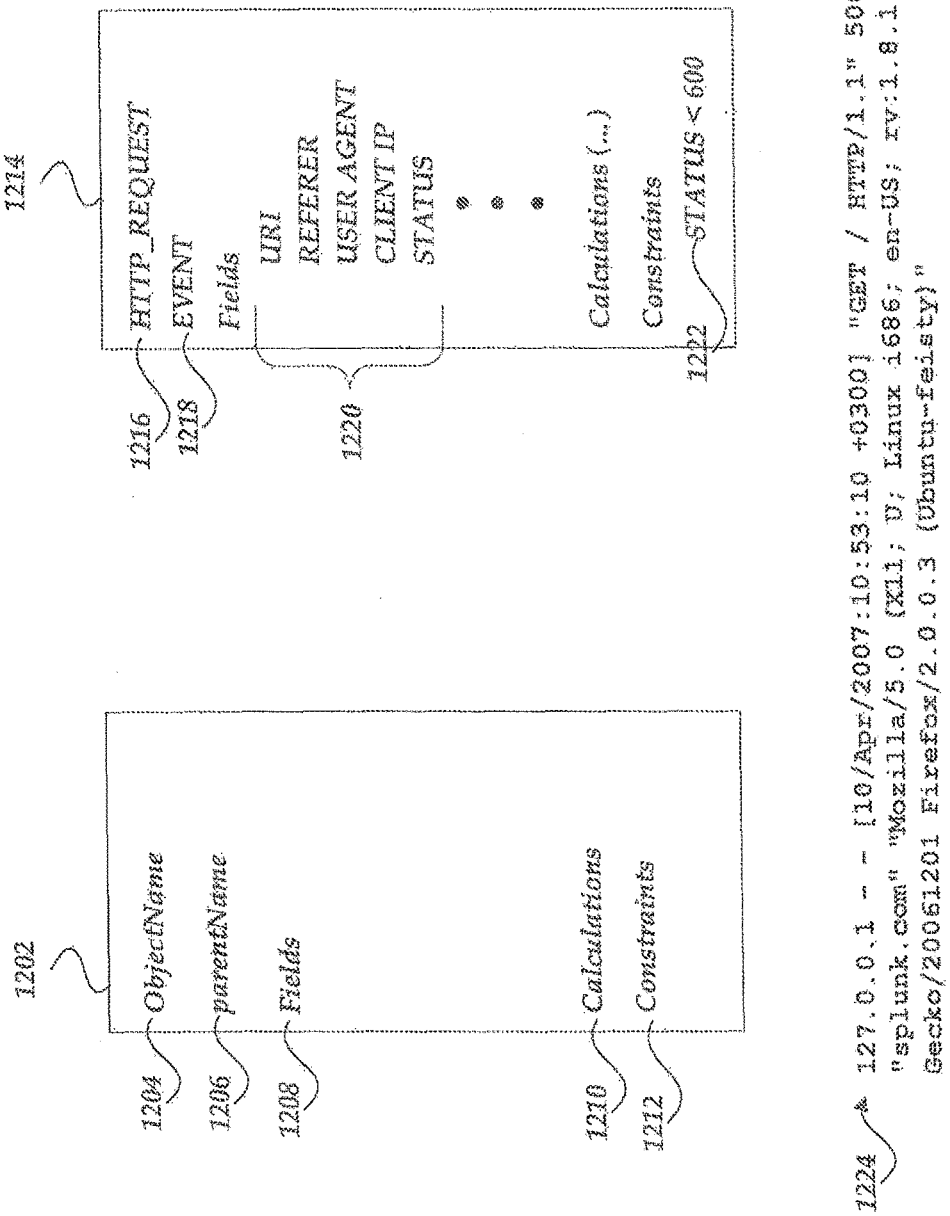
FIG. 12 illustrates for at least one of the various embodiments, a logical structure for data objects that may comprise a data model.

FIGS. 12-15 represents embodiments of a data modeling architecture for at least one of the various embodiments. FIG. 12 illustrates for at least one of the various embodiments, a logical structure for data model objects that may comprise a data model. In at least one of the various embodiments, a data model may be generated by a user. In at least one of the various embodiments, users that generate data models understand the structure of the data as it is stored in the data repository.

Also, in at least one of the various embodiments, if a data model and search objects are available, a user may employ search objects to provide collection queries and stats queries to search heads and/or indexers.

In at least one of the various embodiments, if employing a data model, the user may employ data modeling application 428 or data modeling application 288 to systematically encapsulate his or her knowledge of the data enabling data modeling application 428 or data modeling application 288 to provide the data model to other users. In at least one of the various embodiments, users may employ the generated data model(s) to generate reports, generate queries, or the like.

In at least one of the various embodiments, a data model may be composed of one or more of data model objects. In at least one of the various embodiments, data model objects may have a hierarchy analogous to an object-oriented programming class hierarchy, and may inherit either from a root object provided by the data modeling application, or another data model object present in the current data model.

In at least one of the various embodiments, a data model may be defined and/or stored as a JavaScript Object Notation (JSON) file. In other cases, in at least one of the various embodiments, data models may be implemented using, XML, Python, C++, Perl, Java, C, or the like.

The data models described herein are non-limiting examples that are presented to clarify and describe the innovations disclosed herein. One of ordinary skill in the art will appreciate, that various data models, more or less complex, may be generated depending on the type of events being modeled. And that the examples shown in FIGS. 12-15, while sufficient to disclose the various embodiments and innovations discussed herein, illustrate a non-limiting example of a data model in accordance with at least one of the various embodiments.

In at least one of the various embodiments, a data model object corresponds to some type/portion of data in stored in a data repository. In at least one of the various embodiments, data model objects may correspond to events. In at least one of the various embodiments, they may correspond to a transaction or an abstract concept such as "user". In at least one of the various embodiments, data model objects may have a set of fields. Some fields of a data model object may be required while other fields may be optional.

In at least one of the various embodiments, fields may include types such as numerical, string, Boolean, and timestamp, as specified in the data model. In at least one of the various embodiments, a data model object's fields may correspond directly to fields extracted from data in the data repository or they may be calculated by the data modeling application using formulas, regular expressions, or other built-in commands.

In at least one of the various embodiments, data model object 1202 may be arranged to support and/or require certain attributes and/or properties. In at least one of the various embodiments, attribute ObjectName 1204 may include the name of the data model object. In at least one of the various embodiments, if the data model is implemented using an object oriented programming language, ObjectName 1204 may be a class type or class name supported by the underlying language.

In at least one of the various embodiments, attribute parentName 1206 may include an identifier indicating the identity of a parent data model object data model object 1202. In at least one of the various embodiments, parentName 1206 may be employed by the data modeling application to determine if a data model object is a child object of another data model object.

In at least one of the various embodiments, if a value is included for parentName 1206, the data modeling application may determine that the data model object derives from the parent data model object. In at least one of the various embodiments, a child data model object may inherit characteristics, such as, fields, constraints, filters, or the like, from their corresponding parent data model objects.

In at least one of the various embodiments, if parentName 1206 is not explicitly set, the data modeling application may default to the parentName to an appropriate value that may correspond to a built-in root/base class (e.g., Event, or Transaction).

In at least one of the various embodiments, fields 1208 may be a collection of name-value pairs that may be employed to represent properties of the data model object. In at least one of the various embodiments, fields may have various properties, features, or meta-data that may be employed by the data modeling application to determine the characteristics of a particular field. (See FIG. 6 and its accompanying description.)

In at least one of the various embodiments, fields may be determined and/or associated with the data model object based on defaulting rules. Such rules may be included in one or more configuration files and/or configuration stores. Also, in at least one of the various embodiments, fields may be determined by users through a user-interface.

In at least one of the various embodiments, data model objects may include additional properties and/or behaviors such as Calculations 1210, Constraints 1212, or the like. In at least one of the various embodiments, calculations 1210 may be employed to generate field values based on the operation of formulas, functions, custom scripts, or the like. In at least one of the various embodiments, constraints may be employed to exclude data from matching a data model object. In at least one of the various embodiments, constraints may include regular expressions that may be employed to determine if data from a data repository matches and/or maps to a data model object. For example, in at least one of the various embodiments, if a data repository includes web server log events, a regular expression style constraint of uri="*.css" may constrain a data model object to map to web server log events that correspond to HTTP requests for CSS style sheets (e.g, based on the style sheet having an file extension of ".css").

Also, in at least one of the various embodiments, constraints may include logical and/or arithmetic expressions, such as, "bytes>2000" or "code=404", or the like. Further, in at least one of the various embodiments, the rules or formulas included in calculations and/or constraints may reference one or more fields or calculations or constraints.

As an example, in at least one of the various embodiments, data model object 1214 may be configured to represent a HTTP request event. HTTP_REQUEST 1216 may be the data model object name. Further, in at least one of the various embodiments, http requests may be derived from an event data model object. Thus, in at least one of the various embodiments, EVENT 1218 may be the parent name.

In at least one of the various embodiments, fields 1220 may include name value pairs that may be relevant to HTTP requests. Further, in at least one of the various embodiments, HTTP_REQUEST data model objects may be defined with constraint 1222 such that eligible values for the status fields are less than 600.

In at least one of the various embodiments, data models may be arranged to represent (e.g., model) unstructured data from various sources. Such sources may include, web server logs, networking system logs, financial transaction events, or the like.

In at least one of the various embodiments, log record 1224 may be a HTTP request log record that data model object 1214 may be arranged to model. Data included in the log record may be mapped into fields 1220 of data model object 1214. In at least one of the various embodiments, the particular fields may be identified, collected, and extracted, using a variety of techniques.

Also, data models may be arranged to model data provided in a variety of formats and/or stored in a variety of data repositories including, SQL databases, flat files, fixed record length files, comma separated files (CSV), extensible markup language (XML), or the like.

Figure 13:
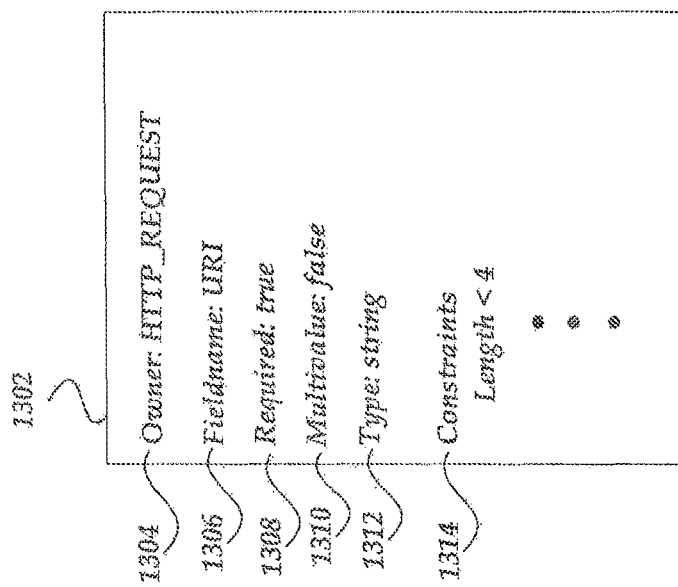
FIG. 13 illustrates for at least one of the various embodiments, the logical data structure of fields that may be part of a data model object.

FIG. 13 illustrates for at least one of the various embodiments, the logical data structure of field 1302 that may be part of a data model object, such as, fields 1220 in FIG. 12. In at least one of the various embodiments, fields may have a variety of properties that may characterize and/or define the data that the field may be designed to model.

In at least one of the various embodiments, a field may include owner 1304, fieldname 1306, required flag 1308, multi-value flag 1310, type 1312, constraints 1314, or the like. In at least one of the various embodiments, the data modeling application may employ at least a portion of the attributes and/or meta-data associated with a field if determining the mapping between the source data and the data model object.

In at least one of the various embodiments, owner 1304 may indicate particular the data model object that may own the field. In at least one of the various embodiments, fieldname 1306 may define the name of the field. In at least one of the various embodiments, flags such as required 1308 and multi-value 1310 may be Boolean style fields that may be true or false. In at least one of the various embodiments, the values of the Boolean attributes may indicate if particular characteristics may be associated with a particular field. For example, in at least one of the various embodiments, required attribute 1308 may be interpreted by the data modeling application to indicate that the corresponding field is required to be filled/populated with data. Likewise, in at least one of the various embodiments, field attribute 1310 may be interpreted by the data modeling application to indicate if the field may include multiple values.

In at least one of the various embodiments, type attribute 1312 may be interpreted by the data modeling application to classify the field data based on the type of data expected. For example, in at least one of the various embodiments, common data types may include, integer, string, numeric, date-time, timestamp, Boolean, or the like.

Also, in at least one of the various embodiments, fields may be associated with constraints that may be applied by the data modeling application as part of determining eligible values for the field. For example, in at least one of the various embodiments, constraints 1314 may be employed by the data modeling application to determine that eligible/valid data for field 1302 requires a length that is greater than four.

Figure 14:
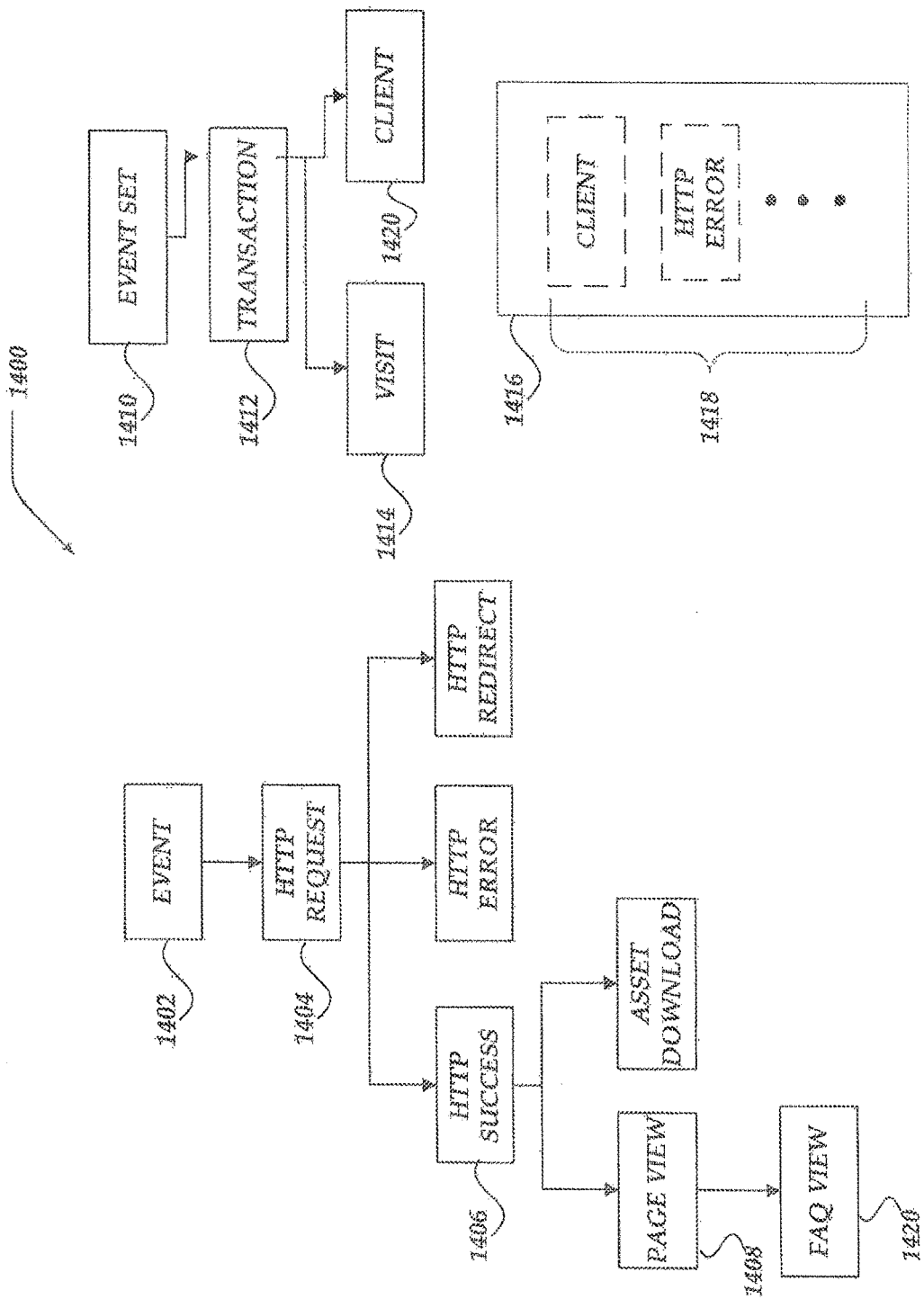
FIG. 14 illustrates for at least one of the various embodiments, a logical representation of a data model that may be generated and/or employed by the data modeling application.

FIG. 14 illustrates for at least one of the various embodiments, a logical representation of a data model that may be generated and/or employed by the data modeling application. In at least one of the various embodiments, the data modeling application may employ general object oriented concepts based on, and/or similar to object-oriented programming languages and/or platforms, such as, C++, Java, Objective-C, C#, or the like.

Further, data model 1400 in FIG. 14 may be a non-limiting example embodiment of a data model that may be generated using at least one of the various embodiments. One of ordinary skill in the art will appreciate that a variety of data models may be generated using at least one the various embodiments for a variety of different application contexts. The particular model discussed in FIG. 14 is presented in the interest of brevity and to provide additional clarity in the description of at least one of the various embodiments.

In at least one of the various embodiments, the data model in FIG. 14 may represent a portion of a data model directed towards modeling events that may be related to HTTP servers and client interaction with HTTP servers.

In at least one of the various embodiments, model object EVENT 1402 may be the root of the data model. In at least one of the various embodiments, it may be a base data model object that provides core properties and behaviors that may be expected to be common to many events the data model may be expected model.

In at least one of the various embodiments, data model object HTTP REQUEST 1404 may be derived from EVENT 1402. In at least one of the various embodiments, data model object 1404 may be specialization of EVENT 1402 that may include properties and fields that may be expected to be associated with a HTTP request events. In at least one of the various embodiments, such properties may include a uniform resource identifier (URI) field, a referrer field, or the like. (See, FIG. 12.)

Further, in at least one of the various embodiments, data model object HTTP SUCCESS 1406 may be derived from HTTP REQUEST 1404. In at least one of the various embodiments, HTTP SUCCESS 1406 may be a data model object specialized to represent a HTTP request that had a successful outcome. In at least one of the various embodiments, such specialization may include a constraint that requires the status of the request to be 200, 201, 202, 203, 204, or the like (e.g., success status codes that start with 2).

In at least one of the various embodiments, PAGE VIEW 1408 may be a further specialization derived from HTTP SUCCESS 1406 that models successful HTTP requests that may represent a client viewing a web page. Also, in at least one of the various embodiments, FAQ VIEW 1420 may be a further specialization of PAGE VIEW 1408. In one embodiment FAQ VIEW 1420 may include one or more constraints that limit the data model object to representing successful HTTP views of a frequently asked question page (FAQ).

In at least one of the various embodiments, data model objects in a data model may have different and/or separate root model objects. In at least one of the various embodiments, EVENT SET 1410 may be a root data model object that may be arranged to model one or more events group based on criteria defined by the event set object. In at least one of the various embodiments, event set objects may be employed to detect and/or perform operations on groups of events. For example, event set objects may be employed to run a clustering algorithm on the data in the data repository for determining groups of similar events.

In at least one of the various embodiments, TRANSACTION OBJECT 1412 may be a specialization of an event set object that may be defined to model events that occur within a determined time period, in a particular order, having particular field values, or the like.

In at least one of the various embodiments, data model object VISIT 1414 may be a specialized transaction that may be arranged to model one or more particular sequence of events that represent a user visiting a portion of a website. Likewise, data model object CLIENT 1420 may be defined to represent a sequence of events that represent a client visiting a website.

In at least one of the various embodiments, users may employ the data modeling application to generate searches and/or reports based on a data model. In at least one of the various embodiments, search object 1416 may be defined by selecting one or more data model objects 1418. In at least one of the various embodiments, a search object may be defined to apply particular fields of one or more data model objects to implement a search that corresponds to the a desired report. Also, in at least one of the various embodiments, a search object may be defined to include its own fields that may be employed to produce, format, and/or display portions of the data model objects that may be included in the report.

In at least one of the various embodiments, search objects may include one or more fields from one or more data model objects. Also, in at least one of the various embodiments, search objects may include aggregate fields that enable the computation and display of aggregate results such as, sums, maximum, root-mean square, or the like, to be determined as part of a report.

Figure 15:
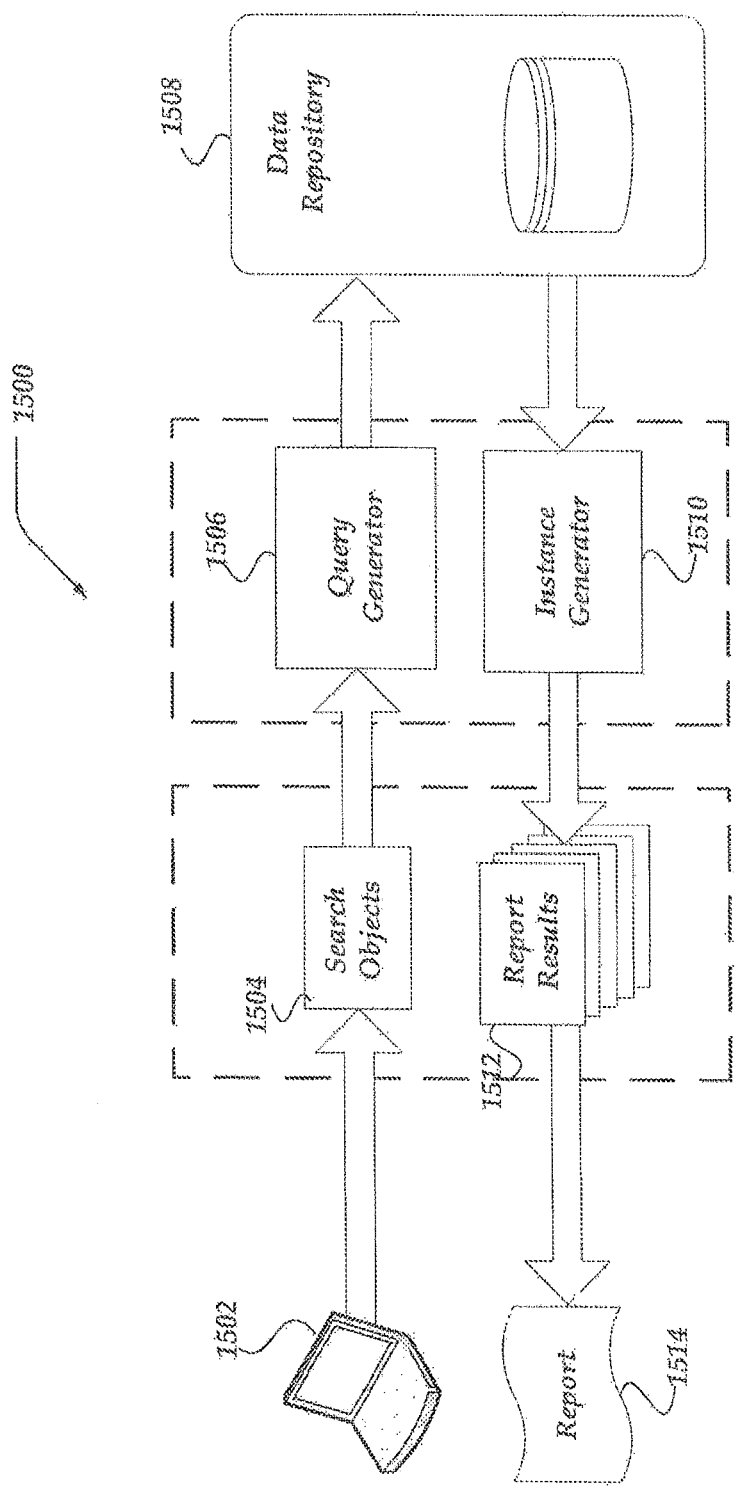
FIG. 15 illustrates a logical overview of a system for at least one of the various embodiments for generating reports using a data model.

FIG. 15 illustrates a logical overview of data modeling application 1500 for at least one of the various embodiments for generating reports using a data model. In at least one of the various embodiments, a user may initiate the generation of a report at a user-interface on network device 1502.

In at least one of the various embodiments, the user may select and/or generate search objects 1504. In at least one of the various embodiments, search objects 1504 may comprise search elements selected from one or more data models. In at least one of the various embodiments, search objects may be retrieved from a set of previously generated search objects or it may be generated at the time the user generates the report.

In at least one of the various embodiments, search objects may be generated based on data model objects selected from a data model. In at least one of the various embodiments, the data model object constraints, fields, or constraints used to define a data model object may be sufficient for searching to generating the expected report results. In at least one of the various embodiments, search objects may be processed by the data modeling application to generate query strings that may be executed against one or more data repositories.

For example, in at least one of the various embodiments, data model object FAQ VIEW 1420 may include a constraint that requires a uniform resource identifier (URI) field to match a particular page (e.g., www.splunk.com/faq.html) to produce report results that include events representing page views of a FAQ page (e.g., matching the URI pattern of interest).

In at least one of the various embodiments, the selected/generated search objects may be received by query generator 1506. In at least one of the various embodiments, query generator 1506 may employ the search objects, and/or the data model to generate a query string and/or search string that may correspond to the requested report. In at least one of the various embodiments, the query string and/or search string may be generated based on the data model objects that may contribute data to the report.

In at least one of the various embodiments, data repository 1508 may receive the query string generated by query generator 1506. In at least one of the various embodiments, the query string may be executed against data stored in the data repository to produce a corresponding result set. In at least one of the various embodiments, the result set may be presented in a format native to the operative data repository.

In at least one of the various embodiments, instance generator 1510 may receive the result set from the data repository and produce instances of data model objects corresponding to the result set. In at least one of the various embodiments, instance generator 1510 may generate report results 1512 that may include a collection of instantiated data model objects.

From report results 1512, in at least one of the various embodiments, a report may be generated. In at least one of the various embodiments, report 1514 may be formatted for a user to read on web page or other user interface. Also, in at least one of the various embodiments, reports may be formatted for printing, exporting to other applications, exporting to other network devices, archiving, or the like.

In at least one of the various embodiments, reports, report views, and/or report formatting may be based on the data model, search objects, or report templates associated with the generated report results. For example, in at least one of the various embodiments, data model objects comprising the report results may include several fields, such as, URI, Timestamp, Referrer, CookieName, or the like. A report view, in at least one of the various embodiments, may be configured to selectively list a portion of the available fields, such as, just the URI and Timestamp. In at least one of the various embodiments, a user may design reports and/or report templates in terms of the data models and/or search objects (e.g., for pivot reports). In at least one of the various embodiments, the one or more report models may be employed to generate the reports.

What is claimed:

1. A method, comprising:
   creating a set of field searchable, time stamped event records from raw data stored in at least one data store, wherein each field searchable, time stamped event record in the set of field searchable, time stamped event records includes a portion of the raw data and is associated with a time stamp derived from the raw data, wherein the raw data reflects activity in an information technology environment;
   storing the set of field searchable, time stamped event records in an indexed data store, wherein the indexed data store comprises a distributed indexed data store;
   generating a summarization table for a set of fields in the set of field searchable, time stamped event records that identifies one or more field values in the set of fields and for each field value, one or more posting values to field searchable, time stamped event records having the field value, wherein a field value comprises a value that appears in an associated field in one or more field searchable, time stamped event records in the set of field searchable, time stamped event records, wherein the summarization table includes two or more table portions, and wherein each of the two or more table portions is stored in a location associated with a subset of the event records to which it pertains;
   storing the summarization table;
   receiving a search query that includes search criteria for evaluating field values for one or more fields;
   using the search criteria to evaluate the field values for the one or more fields in the summarization table to generate a query result;
   in response to determining that summarization information in the summarization table is incomplete, generating summarization information for event records responsive to the search query in real time to add to the query result; and
   causing display of information based on the query result.

2. The method of claim 1, further comprising:
   executing an action based on the query result.

3. The method of claim 1, further comprising:
   based on using the search criteria to evaluate field values for one or more fields in the summarization table, retrieving event records identified in the summarization table for further processing to generate the query result.

4. The method of claim 1, wherein the query result is generated from the summarization table by retrieving event records identified in the summarization table.

5. The method of claim 1, further comprising:
   storing the set of field searchable, time stamped event records in an indexed data store.

6. The method of claim 1,
   wherein the indexed data store is stored in a distributed manner among two or more servers.

7. The method of claim 1, further comprising:
   receiving a command identifying fields to include in the summarization table for the set of field searchable, time stamped event records.

8. The method of claim 1, wherein the raw data includes machine data.

9. The method of claim 1, wherein the raw data includes log data.

10. The method of claim 1, wherein the raw data includes unstructured data.

11. The method of claim 1, wherein the two or more table portions are stored in a distributed manner.

12. An apparatus, comprising:
an event creator, implemented at least partially in hardware, operable to use a processor to create a set of field searchable, time stamped event records from raw data stored in at least one data store, wherein each field searchable, time stamped event record in the set of field searchable, time stamped event records includes a portion of the raw data and is associated with a time stamp derived from the raw data, wherein the raw data reflects activity in an information technology environment;
a memory operable to store the set of field searchable, time stamped event records in an indexed data store, wherein the indexed data store comprises a distributed indexed data store;
a summarization table generator, implemented at least partially in hardware, that generates a summarization table for a set of fields in the set of field searchable, time stamped event records that identifies one or more field values in the set of fields and for each field value, one or more posting values to field searchable, time stamped event records having the field value, wherein a field value comprises a value that appears in an associated field in one or more field searchable, time stamped event records in the set of field searchable, time stamped event records, wherein the summarization table includes two or more table portions, and wherein each of the two or more table portions is stored in a location associated with a subset of the event records to which it pertains;
a storage subsystem, implemented at least partially in hardware, that stores the summarization table;
a search query receiver, implemented at least partially in hardware, that receives a search query that includes search criteria for evaluating field values for one or more fields;
a search query processor, implemented at least partially in hardware, that uses the search criteria to evaluate the field values for the one or more fields in the summarization table to generate a query result;
wherein the search query processor, in response to determining that summarization information in the summarization table is incomplete, generates summarization information for event records responsive to the search query in real time to add to the query result; and
a display formatter, implemented at least partially in hardware, that causes display of information based on the query result.

13. The apparatus of claim 12, further comprising:
an action execution subsystem, implemented at least partially in hardware, that executes an action based on the query result.

14. The apparatus of claim 12, wherein the search processor, based on using the search criteria to evaluate field values for one or more fields in the summarization table, retrieves event records identified in the summarization table for further processing to generate the query result.

15. The apparatus of claim 12, wherein the query result is generated from the summarization table by retrieving event records identified in the summarization table.

16. One or more non-transitory computer-readable storage media, storing one or more sequences of instructions, which when executed by one or more processors cause performance of:
creating a set of field searchable, time stamped event records from raw data stored in at least one data store, wherein each field searchable, time stamped event record in the set of field searchable, time stamped event records includes a portion of the raw data and is associated with a time stamp derived from the raw data, wherein the raw data reflects activity in an information technology environment;
storing the set of field searchable, time stamped event records in an indexed data store, wherein the indexed data store comprises a distributed indexed data store;
generating a summarization table for a set of fields in the set of field searchable, time stamped event records that identifies one or more field values in the set of fields and for each field value, one or more posting values to field searchable, time stamped event records having the field value, wherein a field value comprises a value that appears in an associated field in one or more field searchable, time stamped event records in the set of field searchable, time stamped event records, wherein the summarization table includes two or more table portions, and wherein each of the two or more table portions is stored in a location associated with a subset of the event records to which it pertains;
storing the summarization table;
receiving a search query that includes search criteria for evaluating field values for one or more fields;
using the search criteria to evaluate the field values for the one or more fields in the summarization table to generate a query result;
in response to determining that summarization information in the summarization table is incomplete, generating summarization information for event records responsive to the search query in real time to add to the query result; and
causing display of information based on the query result.

17. The one or more non-transitory computer-readable storage media of claim 16, further comprising:
based on using the search criteria to evaluate field values for one or more fields in the summarization table, retrieving event records identified in the summarization table for further processing to generate the query result.

18. The one or more non-transitory computer-readable storage media of claim 16, wherein the query result is generated from the summarization table by retrieving event records identified in the summarization table.

* * * * *